US008862847B2

(12) United States Patent
Feng et al.

(10) Patent No.: US 8,862,847 B2
(45) Date of Patent: Oct. 14, 2014

(54) DISTRIBUTED STORAGE METHOD, APPARATUS, AND SYSTEM FOR REDUCING A DATA LOSS THAT MAY RESULT FROM A SINGLE-POINT FAILURE

(71) Applicant: Huawei Technologies Co., Ltd., Shenzhen (CN)

(72) Inventors: Bin Feng, Santa Clara, CA (US); Cheng Huang, Shenzhen (CN); Xuewen Gong, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 14/132,863

(22) Filed: Dec. 18, 2013

(65) Prior Publication Data

US 2014/0229696 A1    Aug. 14, 2014

Related U.S. Application Data

(63) Continuation of application No. PCT/CN2013/080990, filed on Aug. 7, 2013.

(30) Foreign Application Priority Data

Feb. 8, 2013    (CN) .......................... 2013 1 0050257

(51) Int. Cl.
*G06F 12/02* (2006.01)
*G06F 3/06* (2006.01)

(52) U.S. Cl.
CPC ............ *G06F 3/0647* (2013.01); *G06F 3/0619* (2013.01); *G06F 3/067* (2013.01)
USPC ............ 711/162; 711/112; 711/114; 714/6.2; 714/6.22; 714/6.24; 714/6.3; 714/6.32

(58) Field of Classification Search
CPC ....... G06F 12/02; G06F 3/0647; G06F 3/067; G06F 3/0619
USPC ......... 711/162, 112, 114; 714/6.2, 6.22, 6.24, 714/6.3, 6.32
See application file for complete search history.

(56) References Cited

U.S. PATENT DOCUMENTS 5,664,187 A *   9/1997  Burkes et al. ................. 711/114
7,783,600 B1 *  8/2010  Spertus et al. ................ 707/622

(Continued)

FOREIGN PATENT DOCUMENTS

CN          1472963 A         2/2004
CN        101145933 A         3/2008

(Continued)

*Primary Examiner* — Stephen Elmore
(74) *Attorney, Agent, or Firm* — Huawei Technologies Co., Ltd.

(57) ABSTRACT

A distributed data storage method, apparatus, and system for reducing a data loss that may result from a single-point failure. The method includes: splitting a data file to generate K data slices, splitting each data slice of the K data slices to generate M data blocks for each data slice, and performing check coding on the M data blocks by using a redundancy algorithm to generate N check blocks; determining, by using a random algorithm, a first physical storage node corresponding to one block of the M data blocks and the N check blocks, and determining at least M+1 different physical storage nodes based on the determined first physical storage node and according to a first rule-based sorting manner; and storing at least M+1 blocks of the M data blocks and the N check blocks onto the at least M+1 different storage nodes, where K, M, and N are integers.

31 Claims, 11 Drawing Sheets

(56) References Cited

U.S. PATENT DOCUMENTS

| | | | | |
|---|---|---|---|---|
| 8,051,205 | B2* | 11/2011 | Roy et al. | 709/244 |
| 8,364,716 | B2* | 1/2013 | Gaonkar et al. | 707/791 |
| 8,433,869 | B1* | 4/2013 | Natanzon et al. | 711/162 |
| 8,463,820 | B2* | 6/2013 | Chhugani et al. | 707/797 |
| 8,538,029 | B2* | 9/2013 | Li et al. | 380/279 |
| 2011/0060887 | A1 | 3/2011 | Thatcher et al. | |
| 2011/0078116 | A1 | 3/2011 | Zhang et al. | |
| 2012/0290868 | A1* | 11/2012 | Gladwin et al. | 714/4.1 |
| 2012/0290877 | A1* | 11/2012 | Grube et al. | 714/15 |
| 2012/0290878 | A1* | 11/2012 | Gladwin et al. | 714/20 |
| 2013/0036289 | A1* | 2/2013 | Welnicki et al. | 711/173 |

FOREIGN PATENT DOCUMENTS

| | | |
|---|---|---|
| CN | 101175011 A | 5/2008 |
| CN | 101834897 A | 9/2010 |
| CN | 101834899 A | 9/2010 |
| CN | 102279777 A | 12/2011 |
| CN | 102598019 A | 7/2012 |
| CN | 102624866 A | 8/2012 |

* cited by examiner

|  | | | | | | | | Hard disk i-1 | Hard disk i | Hard disk i+1 | | | | | | |
|---|---|---|---|---|---|---|---|---|---|---|---|---|---|---|---|---|
| Slice 1 | | | | | | | | | 1 | 2 | 3 | 4 | 5 | 6 | 7 | 8 | 9 |
| Slice 2 | | | | | | | | 1 | 2 | 3 | 4 | 5 | 6 | 7 | 8 | 9 | |
| Slice 3 | | | | | | | 1 | 2 | 3 | 4 | 5 | 6 | 7 | 8 | 9 | | |
| Slice 4 | | | | | | 1 | 2 | 3 | 4 | 5 | 6 | 7 | 8 | 9 | | | |
| Slice 5 | | | | | 1 | 2 | 3 | 4 | 5 | 6 | 7 | 8 | 9 | | | | |
| Slice 6 | | | | 1 | 2 | 3 | 4 | 5 | 6 | 7 | 8 | 9 | | | | | |
| Slice 7 | | | 1 | 2 | 3 | 4 | 5 | 6 | 7 | 8 | 9 | | | | | | |
| Slice 8 | | 1 | 2 | 3 | 4 | 5 | 6 | 7 | 8 | 9 | | | | | | | |
| Slice 9 | 1 | 2 | 3 | 4 | 5 | 6 | 7 | 8 | 9 | | | | | | | | |

FIG. 5A

|  | | | | | | | | Hard disk i-1 | Hard disk i | Hard disk i' | Hard disk i+1 | | | | | | |
|---|---|---|---|---|---|---|---|---|---|---|---|---|---|---|---|---|---|
| Slice 1 | | | | | | | | | | 1 | 2 | 3 | 4 | 5 | 6 | 7 | 8 | 9 |
| Slice 2 | | | | | | | | | 1 | 2 | 3 | 4 | 5 | 6 | 7 | 8 | 9 | |
| Slice 3 | | | | | | | | 1 | 2 | 3 | 4 | 5 | 6 | 7 | 8 | 9 | | |
| Slice 4 | | | | | | | 1 | 2 | 3 | 4 | 5 | 6 | 7 | 8 | 9 | | | |
| Slice 5 | | | | | | 1 | 2 | 3 | 4 | 5 | 6 | 7 | 8 | 9 | | | | |
| Slice 6 | | | | | 1 | 2 | 3 | 4 | 5 | 6 | 7 | 8 | 9 | | | | | |
| Slice 7 | | | | 1 | 2 | 3 | 4 | 5 | 6 | 7 | 8 | 9 | | | | | | |
| Slice 8 | | | 1 | 2 | 3 | 4 | 5 | 6 | 7 | 8 | 9 | | | | | | | |
| Slice 9 | | 1 | 2 | 3 | 4 | 5 | 6 | 7 | 8 | 9 | | | | | | | | |

FIG. 5B

|        | Hard disk i-1 | | | | | | | Hard disk i | Hard disk i+1 | | | | | | | |
|--------|---|---|---|---|---|---|---|---|---|---|---|---|---|---|---|---|
| Slice 1 | | | | | | | | 1 | 2 | 3 | 4 | 5 | 6 | 7 | 8 | 9 |
| Slice 2 | | | | | | | 1 | 2 | 3 | 4 | 5 | 6 | 7 | 8 | 9 | |
| Slice 3 | | | | | | 1 | 2 | 3 | 4 | 5 | 6 | 7 | 8 | 9 | | |
| Slice 4 | | | | | 1 | 2 | 3 | 4 | 5 | 6 | 7 | 8 | 9 | | | |
| Slice 5 | | | | 1 | 2 | 3 | 4 | | 5 | 6 | 7 | 8 | 9 | | | |
| Slice 6 | | | 1 | 2 | 3 | 4 | 5 | | 6 | 7 | 8 | 9 | | | | |
| Slice 7 | | 1 | 2 | 3 | 4 | 5 | 6 | | 7 | 8 | 9 | | | | | |
| Slice 8 | 1 | 2 | 3 | 4 | 5 | 6 | 7 | | 8 | 9 | | | | | | |
| Slice 9 | 1 | 2 | 3 | 4 | 5 | 6 | 7 | 8 | 9 | | | | | | | |

FIG. 5C

|        | Hard disk i-1 | | | | | | | Hard disk i | Hard disk i' | Hard disk i+1 | | | | | | |
|--------|---|---|---|---|---|---|---|---|---|---|---|---|---|---|---|---|
| Slice 1 | | | | | | | | 1 | | 2 | 3 | 4 | 5 | 6 | 7 | 8 | 9 |
| Slice 2 | | | | | | | | 1 | 2 | 3 | 4 | 5 | 6 | 7 | 8 | 9 | |
| Slice 3 | | | | | | | 1 | 2 | 3 | 4 | 5 | 6 | 7 | 8 | 9 | | |
| Slice 4 | | | | | | 1 | 2 | 3 | 4 | 5 | 6 | 7 | 8 | 9 | | | |
| Slice 5 | | | | | 1 | 2 | 3 | 4 | 5 | 6 | 7 | 8 | 9 | | | | |
| Slice 6 | | | | 1 | 2 | 3 | 4 | 5 | 6 | 7 | 8 | 9 | | | | | |
| Slice 7 | | | 1 | 2 | 3 | 4 | 5 | 6 | 7 | 8 | 9 | | | | | | |
| Slice 8 | | 1 | 2 | 3 | 4 | 5 | 6 | 7 | 8 | 9 | | | | | | | |
| Slice 9 | 1 | 2 | 3 | 4 | 5 | 6 | 7 | 8 | 9 | | | | | | | | |

FIG. 6A

DISTRIBUTED STORAGE METHOD, APPARATUS, AND SYSTEM FOR REDUCING A DATA LOSS THAT MAY RESULT FROM A SINGLE-POINT FAILURE

CROSS-REFERENCE TO RELATED APPLICATIONS

The present invention relates to the data storage field, and in particular, to a distributed storage method, apparatus, and system for reducing a data loss that may result from a single-point failure.

TECHNICAL FIELD

The present invention relates to the data storage field, and in particular, to a distributed storage method, apparatus, and system.

BACKGROUND

In a distributed storage system, for the purpose of achieving reliability, a file-level multi-copy redundancy technology is adopted, or a data-block-level redundancy coding technology, for example, an erasure coding technology, is adopted. In the multi-copy redundancy technology, the probability of data loss may be reduced by storing multiple same copies for one data file, and in the redundancy coding technology, reliability may be improved by adding a check block for any partial data in a file.

Generally, a distributed hash table (DHT) may be adopted to store a data block and a check block. However, because of randomicity of the DHT, it cannot be avoided that multiple data blocks of a same data slice are deployed on a same physical storage node, and therefore it cannot be avoided that invalidity of a single physical storage node (for example, a rack, a server, or a hard disk) results in a risk of data loss. For example, an M+N erasure coding technology is adopted, where M is the number of data blocks, and N is the number of check blocks, and when more than N+1 data blocks or check blocks are deployed on a same hard disk, a failure of the hard disk may result in a loss of the M data blocks, and therefore may result in unavailability of the whole file. Using a 12+3 redundancy storage mechanism as an example, when more than 4 data blocks are lost, a data slice may be lost and cannot be restored.

In other words, in an existing distributed storage system, a single-point (for example, a hard disk, a server, or a rack) failure may result in a data loss, and the risk and probability of the failure are extremely high especially when the scale of the distributed storage system is relatively small, thereby reducing the reliability of the distributed storage system.

SUMMARY

Embodiments of the present invention provide a distributed storage method, apparatus, and system, which are capable of improving the reliability of a distributed storage system.

In a first aspect, a distributed storage method is provided, including: splitting a data file to generate K data slices, splitting each data slice of the K data slices to generate M data blocks for each data slice, and performing check coding on the M data blocks by using a redundancy algorithm to generate N check blocks; determining, by using a random algorithm, a first physical storage node corresponding to one data block or one check block of the M data blocks or the N check blocks, and determining at least M+1 different physical storage nodes based on the first physical storage node and according to a first sorting manner that conforms to a preset rule; and separately storing at least M+1 blocks of the M data blocks and the N check blocks onto the at least M+1 different physical storage nodes, where K, M, and N are positive integers.

With reference to the first aspect, in a first possible implementation manner, the determining, by using a random algorithm, a first physical storage node corresponding to one data block or one check block of the M data blocks or the N check blocks includes: performing a hash calculation on an identifier of one data block or check block of the M data blocks or the N check blocks to generate a key value; and determining, according to the key value, a physical storage node corresponding to one data block or check block of the M data blocks or the N check blocks, and using the physical storage node as the first physical storage node.

With reference to the first aspect, in a second possible implementation manner, the determining, by using a random algorithm, a first physical storage node corresponding to one data block or one check block of the M data blocks or the N check blocks includes: performing a hash calculation on an identifier of the data slice that is split into the M data blocks, so as to generate a key value; and determining, according to the key value, a physical storage node corresponding to one data block or check block of the M data blocks or the N check blocks, and using the physical storage node as the first physical storage node.

With reference to the first aspect or any one of the foregoing possible implementation manners, in a third possible implementation manner, the determining at least M+1 different physical storage nodes based on the determined first physical storage node and according to the first sorting manner includes: determining M+N different physical storage nodes based on the first physical storage node and according to the first sorting manner; and the storing at least M+1 blocks of the M data blocks and the N check blocks onto the at least M+1 different physical storage nodes includes storing the M data blocks and the N check blocks onto the M+N different physical storage nodes.

With reference to the first aspect or any one of the foregoing possible implementation manners, in a fourth possible implementation manner, the determining at least M+1 different physical storage nodes based on the first physical storage node and according to the first sorting manner includes: mapping the first physical storage node to one block of the at least M+1 blocks, and determining, based on a position of the first physical storage node and according to the first sorting manner, physical storage nodes corresponding to other at least M blocks of the at least M+1 blocks, where the M+1 different physical storage nodes include the first physical storage node; or determining, based on the position of the first physical storage node and according to the first sorting manner, physical storage nodes corresponding to the at least M+1 blocks, where the M+1 different physical storage nodes do not include the first physical storage node.

With reference to the first aspect or any one of the foregoing possible implementation manners, in a fifth possible implementation manner, the different physical storage nodes are hard disks, and the number of the hard disks is greater than or equal to M+1; or the different physical storage nodes are servers, where the number of the servers is greater than or equal to M+1; or the different physical storage nodes are racks, where the number of the racks is greater than or equal to M+1.

With reference to the first aspect or any one of the foregoing possible implementation manners, in a sixth possible implementation manner, the method in the first aspect further includes restoring data on the faulty physical storage node of the at least M+1 different physical storage nodes onto a hot standby storage node in a distributed storage system on which the physical storage node is located if one of the at least M+1 different physical storage nodes that store at least M+1 blocks of the M data blocks and the N check blocks is faulty.

With reference to the first aspect or any one of the foregoing possible implementation manners, in a seventh possible implementation manner, the method in the first aspect further includes sequentially migrating the Lth block of the M data blocks and the N check blocks that are sorted according to the first sorting manner and blocks prior to the Lth block to adjacent physical storage nodes along a first direction if a physical storage node of an Lth block of the M data blocks and the N check blocks that are sorted according to the first sorting manner and stored on the at least M+1 different physical storage nodes is faulty and if L is not greater than (M+N)/2, where the first direction is opposite to a direction of a sequence in the first sorting manner; and if L is greater than (M+N)/2, sequentially migrating the Lth block of the M data blocks and the N check blocks that are sorted according to the first sorting manner and blocks after the Lth block to adjacent physical storage nodes along a second direction, where the second direction is the same as the direction of the sequence in the first sorting manner; or if a physical storage node of an Lth block of the M data blocks and the N check blocks that are sorted according to the first sorting manner and stored on the at least M+1 different physical storage nodes is faulty, sequentially migrating the Lth block of the M data blocks and the N check blocks that are sorted according to the first sorting manner and blocks prior to the Lth block to adjacent physical storage nodes along a first direction; or if a physical storage node of an Lth block of the M data blocks and the N check blocks that are sorted according to the first sorting manner and stored on the at least M+1 different physical storage nodes is faulty, sequentially migrating the Lth block of the M data blocks and the N check blocks that are sorted according to the first sorting manner and blocks after the Lth block to adjacent physical storage nodes along a second direction.

With reference to the first aspect or any one of the first to the sixth possible implementation manners, in an eighth possible implementation manner, the method in the first aspect further includes migrating the Pth block of the M data blocks and the N check blocks that are sorted according to the first sorting manner to the new physical storage node if a new physical storage node is added after a physical storage node of a Pth block of the M data blocks and the N check blocks that are sorted according to the first sorting manner and stored on the at least M+1 different physical storage nodes and if P is not greater than (M+N)/2, and sequentially migrating blocks prior to the Pth block of the M data blocks and the N check blocks that are sorted according to the first sorting manner to adjacent physical storage nodes along a first direction, where the first direction is the same as a direction of a sequence in the first sorting manner; and if P is greater than (M+N)/2, migrating a (P+1)th block of the M data blocks and the N check blocks that are sorted according to the first sorting manner to the new physical storage node, and sequentially migrating blocks after the (P+1)th block of the M data blocks and the N check blocks that are sorted according to the first sorting manner to adjacent physical storage nodes along a second direction, where the second direction is opposite to the direction of the sequence in the first sorting manner, and P is an integer; or if a new physical storage node is added after a physical storage node of a Pth block of the M data blocks and the N check blocks that are sorted according to the first sorting manner and stored on the at least M+1 different physical storage nodes, migrating the Pth block of the M data blocks and the N check blocks that are sorted according to the first sorting manner to the new physical storage node, and sequentially migrating blocks prior to the Pth block of the M data blocks and the N check blocks that are sorted according to the first sorting manner to adjacent physical storage nodes along a first direction; or if a new physical storage node is added after a physical storage node on which a Pth block of the M data blocks and the N check blocks that are sorted according to the first sorting manner and stored on the at least M+1 different physical storage nodes is located, migrating a (P+1)th block of the M data blocks and the N check blocks that are sorted according to the first sorting manner to the new physical storage node, and sequentially migrating blocks after the (P+1)th block of the M data blocks and the N check blocks that are sorted according to the first sorting manner to adjacent physical storage nodes along a second direction.

With reference to the first aspect or any one of the foregoing possible implementation manners, in a ninth possible implementation manner, the method in the first aspect further includes determining, by using the random algorithm, the first physical storage node corresponding to one data block or check block of the M data blocks or the N check blocks when the data file needs to be read, and determining at least M different physical storage nodes based on the determined first physical storage node and according to the first sorting manner; reading at least M blocks from the at least M different physical storage nodes, where the read M blocks include the M data blocks or include some data blocks of the M data blocks and some check blocks of the N check blocks; and performing decoding and a reverse check on the at least M blocks to generate M decoded data blocks, and combining the M decoded data blocks to generate the data file.

With reference to the first aspect or any one of the foregoing possible implementation manners, in a tenth possible implementation manner, the data file is acquired from the outside of the distributed storage system, or the data file is acquired from some physical storage nodes of the distributed storage system.

With reference to the first aspect or any one of the foregoing possible implementation manners, in an eleventh possible implementation manner, the redundancy algorithm is an erasure coding algorithm, and the random algorithm is a distributed hash table algorithm.

With reference to the first aspect or any one of the foregoing possible implementation manners, in a twelfth possible implementation manner, the different physical storage nodes are different physical storage nodes on the distributed storage system, each physical storage node of the different physical storage nodes includes multiple virtual storage nodes, and virtual storage nodes with consecutive serial numbers are deployed on the different physical storage nodes according to a second sorting manner that conforms to a preset rule; the determining, by using a random algorithm, a first physical storage node corresponding to one data block or one check block of the M data blocks or the N check blocks, and determining at least M+1 different physical storage nodes based on the determined first physical storage node and according to the first sorting manner includes determining, by using the random algorithm, serial number of a first virtual storage node corresponding to one block of the M data blocks and the N check blocks, and determining serial numbers of at least M+1 virtual storage nodes based on the serial number of the first virtual storage node and according to the first sorting manner; and the separately storing at least M+1 blocks of the M data blocks and the N check blocks onto the at least M+1 different physical storage nodes includes storing the at least M+1 blocks of the M data blocks and the N check blocks onto virtual storage nodes corresponding to the serial numbers of the at least M+1 virtual storage nodes.

With reference to the first aspect or any one of the foregoing possible implementation manners, in a thirteenth possible implementation manner, the first sorting manner or the second sorting manner refers to a method of sequence sorting at a fixed interval.

In a second aspect, a distributed storage apparatus is provided, including: a generating module configured to split a data file to generate K data slices, split each data slice of the K data slices to generate M data blocks for each data slice, and perform check coding on the M data blocks by using a redundancy algorithm to generate N check blocks; a determining module configured to determine, by using a random algorithm, a first physical storage node corresponding to one data block or one check block of the M data blocks or the N check blocks, and determine at least M+1 different physical storage nodes based on the first physical storage node and according to a first sorting manner that conforms to a preset rule; and a storing module configured to separately store at least M+1 blocks of the M data blocks and the N check blocks onto the at least M+1 different physical storage nodes, where K, M, and N are positive integers.

With reference to the second aspect, in a first possible implementation manner of the second aspect, the determining module performs a hash calculation on an identifier of one data block or check block of the M data blocks or the N check blocks to generate a key value, determines, according to the key value, a physical storage node corresponding to one data block or check block of the M data blocks or the N check blocks, and uses the physical storage node as the first physical storage node.

With reference to the second aspect, in a second possible implementation manner of the second aspect, the determining module is configured to perform a hash calculation on an identifier of the data slice that is split into the M data blocks, so as to generate a key value; determine, according to the key value, a physical storage node corresponding to one data block or check block of the M data blocks or the N check blocks, and use the physical storage node as the first physical storage node.

With reference to the second aspect or any one of the foregoing possible implementation manners of the second aspect, in a third possible implementation manner, the determining module determines M+N different physical storage nodes based on the first physical storage node and according to the first sorting manner, and the storing module stores the M data blocks and the N check blocks onto the M+N different physical storage nodes.

With reference to the second aspect or any one of the foregoing possible implementation manners of the second aspect, in a fourth possible implementation manner, the determining module maps the first physical storage node to one block of the at least M+1 blocks, and determines, based on a position of the first physical storage node and according to the first sorting manner, physical storage nodes corresponding to other at least M blocks of the at least M+1 blocks, where the M+1 different physical storage nodes include the first physical storage node; or determines, based on the position of the first physical storage node and according to the first sorting manner, physical storage nodes corresponding to the at least M+1 blocks, where the M+1 different physical storage nodes do not include the first physical storage node.

With reference to the second aspect or any one of the foregoing possible implementation manners of the second aspect, in a fifth possible implementation manner, the different physical storage nodes are hard disks, and the number of the hard disks is greater than or equal to M+1; or the different physical storage nodes are servers, where the number of the servers is greater than or equal to M+1; or the different physical storage nodes are racks, where the number of the racks is greater than or equal to M+1.

With reference to the second aspect or any one of the foregoing possible implementation manners of the second aspect, in a sixth possible implementation manner, the apparatus in the second aspect further includes a restoring module configured to, if one of the at least M+1 different physical storage nodes that store at least M+1 blocks of the M data blocks and the N check blocks is faulty, restore data on the faulty physical storage node of the at least M+1 different physical storage nodes onto a hot standby storage node in a distributed storage system on which the physical storage node is located.

With reference to the second aspect or any one of the foregoing possible implementation manners of the second aspect, in a seventh possible implementation manner, the apparatus in the second aspect further includes: a restoring module configured to sequentially migrate the Lth block of the M data blocks and the N check blocks that are sorted according to the first sorting manner and blocks prior to the Lth block to adjacent physical storage nodes along a first direction if a physical storage node of an Lth block of the M data blocks and the N check blocks that are sorted according to the first sorting manner and stored on the at least M+1 different physical storage nodes is faulty and if L is not greater than (M+N)/2, where the first direction is opposite to a direction of a sequence in the first sorting manner; and if L is greater than (M+N)/2, sequentially migrate the Lth block of the M data blocks and the N check blocks that are sorted according to the first sorting manner and blocks after the Lth block to adjacent physical storage nodes along a second direction, where the second direction is the same as the direction of the sequence in the first sorting manner; or a restoring module configured to sequentially migrate the Lth block of the M data blocks and the N check blocks that are sorted according to the first sorting manner and blocks prior to the Lth block to adjacent physical storage nodes along a first direction if a physical storage node of an Lth block of the M data blocks and the N check blocks that are sorted according to the first sorting manner and stored on the at least M+1 different physical storage nodes is faulty; or a restoring module configured to, sequentially migrate the Lth block of the M data blocks and the N check blocks that are sorted according to the first sorting manner and blocks after the Lth block to adjacent physical storage nodes along a second direction if a physical storage node of an Lth block of the M data blocks and the N check blocks that are sorted according to the first sorting manner and stored on the at least M+1 different physical storage nodes is faulty.

With reference to the second aspect or any one of the foregoing possible implementation manners of the second aspect, in a seventh possible implementation manner, the apparatus in the second aspect further includes: a capacity expansion module configured to migrate the Pth block of the M data blocks and the N check blocks that are sorted according to the first sorting manner to the new physical storage node, and sequentially migrate blocks prior to the Pth block of the M data blocks and the N check blocks that are sorted according to the first sorting manner to adjacent physical storage nodes along a first direction if a new physical storage node is added after a physical storage node of a Pth block of the M data blocks and the N check blocks that are sorted according to the first sorting manner and stored on the at least M+1 different physical storage nodes and if P is not greater than (M+N)/2, where the first direction is the same as a direction of a sequence in the first sorting manner; and if P is greater than (M+N)/2, migrate a (P+1)th block of the M data blocks and the N check blocks that are sorted according to the first sorting manner to the new physical storage node, and sequentially migrate blocks after the (P+1)th block of the M data blocks and the N check blocks that are sorted according to the first sorting manner to adjacent physical storage nodes along a second direction, where the second direction is opposite to the direction of the sequence in the first sorting manner, and P is an integer; or a capacity expansion module configured to, if a new physical storage node is added after a physical storage node of a Pth block of the M data blocks and the N check blocks that are sorted according to the first sorting manner and stored on the at least M+1 different physical storage nodes, migrate the Pth block of the M data blocks and the N check blocks that are sorted according to the first sorting manner to the new physical storage node, and sequentially migrate blocks prior to the Pth block of the M data blocks and the N check blocks that are sorted according to the first sorting manner to adjacent physical storage nodes along a first direction; or a capacity expansion module configured to, if a new physical storage node is added after a physical storage node on which a Pth block of the M data blocks and the N check blocks that are sorted according to the first sorting manner and stored on the at least M+1 different physical storage nodes is located, migrate a (P+1)th block of the M data blocks and the N check blocks that are sorted according to the first sorting manner to the new physical storage node, and sequentially migrate blocks after the (P+1)th block of the M data blocks and the N check blocks that are sorted according to the first sorting manner to adjacent physical storage nodes along a second direction.

With reference to the second aspect or any one of the foregoing possible implementation manners of the second aspect, in a ninth possible implementation manner, the apparatus in the second aspect further includes: the determining module, further configured to determine, by using the random algorithm, the first physical storage node corresponding to one data block or check block of the M data blocks or the N check blocks when the data file needs to be read, and determine at least M different physical storage nodes based on the determined first physical storage node and according to the first sorting manner; and the apparatus in the second aspect further includes a reading module configured to read at least M blocks from the M different physical storage nodes, where the read M blocks include the M data blocks or include some data blocks of the M data blocks and some check blocks of the N check blocks, where the generating module is further configured to perform decoding and a reverse check on the at least M blocks to generate M decoded data blocks, and combine the M decoded data blocks to generate the data file.

With reference to the second aspect or any one of the foregoing possible implementation manners of the second aspect, in a tenth possible implementation manner, the apparatus in the second aspect further includes an acquiring module configured to acquire the data file from the outside of the distributed storage system, or acquire the data file from some physical storage nodes of the distributed storage system.

With reference to the second aspect or any one of the foregoing possible implementation manners of the second aspect, in an eleventh possible implementation manner, the redundancy algorithm is an erasure coding algorithm, and the random algorithm is a distributed hash table algorithm.

With reference to the second aspect or any one of the foregoing possible implementation manners of the second aspect, in a twelfth possible implementation manner, the different physical storage nodes are different physical storage nodes in the distributed storage system, each physical storage node of the different physical storage nodes includes multiple virtual storage nodes, and virtual storage nodes with consecutive serial numbers are deployed on the different physical storage nodes according to a second sorting manner that conforms to a preset rule; the determining module determines, by using the random algorithm, serial number of a first virtual storage node corresponding to one block of the M data blocks and the N check blocks, and determines serial numbers of at least M+1 virtual storage nodes based on the serial number of the first virtual storage node and according to the first sorting manner; and the storing module stores the at least M+1 blocks of the M data blocks and the N check blocks onto virtual storage nodes corresponding to the serial numbers of the at least M+1 virtual storage nodes.

With reference to the second aspect or any one of the foregoing possible implementation manners of the second aspect, in a thirteenth possible implementation manner, the first sorting manner or the second sorting manner refers to a method of sequence sorting at a fixed interval.

In a third aspect, a distributed storage system is provided, including, a client, multiple physical storage nodes, and the distributed storage apparatus in the second aspect, where the distributed storage apparatus stores/reads a data file of a user onto/from the multiple physical storage nodes according to a storage/read request sent by the user through the client.

In the embodiments of the present invention, a storage node corresponding to a data block of a data file can be determined by using a random algorithm, at least M+1 different physical storage nodes are determined based on the determined storage node and according to a rule-based sorting manner, and at least M+1 blocks of M data blocks and N check blocks are stored on the at least M+1 different physical storage nodes, so that data blocks of data slices can be deployed on physical storage nodes as different as possible according to the rule-based sorting manner, and a data loss that may result from a sing-point failure is reduced, thereby improving the reliability of a distributed storage system.

BRIEF DESCRIPTION OF DRAWINGS

To describe the technical solutions in the embodiments of the present invention more clearly, the following briefly describes the accompanying drawings required for describing the embodiments of the present invention. The accompanying drawings in the following description show merely some embodiments of the present invention, and a person of ordinary skill in the art may still derive other drawings from these accompanying drawings without creative efforts.

FIG. 5A is a schematic diagram of storage positions of some data slices when a hard disk of a distributed storage system is faulty according to an embodiment of the present invention;

FIG. 5B is a schematic diagram of storage positions of some data slices of a distributed storage system after fault recovery according to an embodiment of the present invention;

FIG. 5C is a schematic diagram of storage positions of some data slices of a distributed storage system after fault recovery according to another embodiment of the present invention;

FIG. 6A is a schematic diagram of storage positions of some data slices when capacity expansion is performed for a distributed storage system according to an embodiment of the present invention;

DESCRIPTION OF EMBODIMENTS

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

In a distributed storage system, multiple hard disks may be constructed into a storage array, and storage space of each hard disk is divided into multiple virtual nodes (VN), which are also called partitions. Each virtual node has an independent serial number, and the virtual nodes generally have storage space of the same size; for example, a virtual node with a logical serial number is randomly deployed on a hard disk with a physical serial number.

During data storage, the distributed storage system splits a file to generate multiple data slices, then splits a data slice to generate multiple data blocks, adds corresponding check blocks, maps the data blocks and the check blocks to virtual node serial numbers by using a DHT, and finally randomly distributes the data blocks and the data check blocks onto virtual nodes corresponding to the virtual node serial numbers. Similarly, because of randomicity of the DHT, it still cannot be avoided that multiple data blocks of a same data slice are deployed on a same physical storage node, and therefore it cannot be avoided that invalidity of a single physical storage node results in a risk of data loss.

Figure 1:
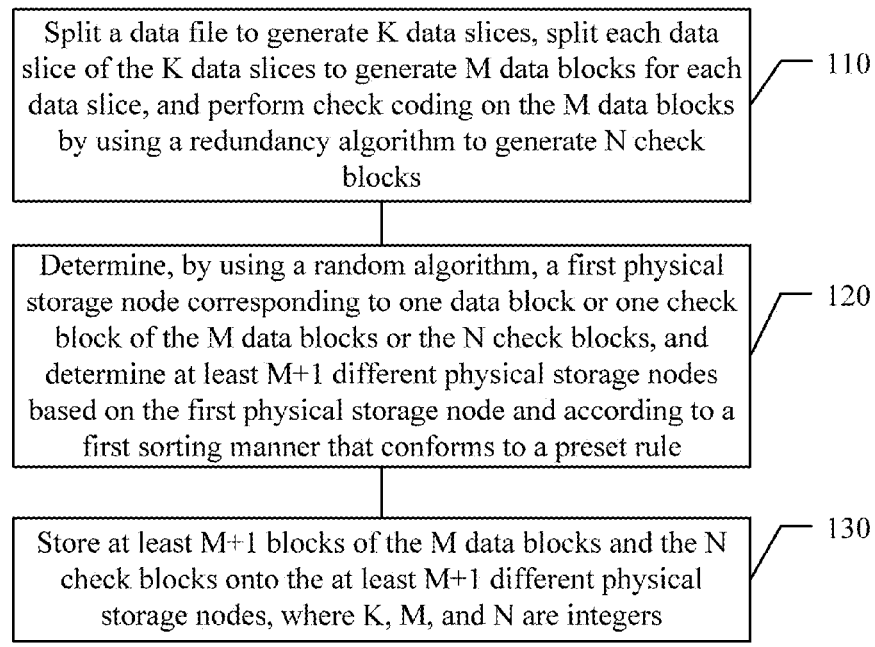
FIG. 1 is a schematic flowchart of a distributed storage method according to an embodiment of the present invention.

FIG. 1 is a schematic flowchart of a distributed storage method according to an embodiment of the present invention. The method in FIG. 1 may be executed by a distributed storage system and specifically may be executed by a storage engine in the distributed storage system.

110. Split a data file to generate K data slices, split each data slice of the K data slices to generate M data blocks for each data slice, and perform check coding on the M data blocks by using a redundancy algorithm to generate N check blocks.

For example, the distributed storage system may receive a storage request sent by a user through a client, and authenticate the user according to identity information of the user, where the identity information is carried in the storage request. This is not limited in this embodiment of the present invention. For example, the distributed storage system may also directly receive a data file uploaded by the user and store it, without the need of authentication. After the authentication succeeds, the distributed storage system may receive the data file sent by the user.

Alternatively, the data file may also be acquired from some physical storage nodes of the distributed storage system; for example, when large-scale capacity expansion is performed, a new distributed storage system may acquire the data file from some physical storage nodes (physical storage nodes of an original distributed storage system).

The distributed storage system in this embodiment of the present invention may allocate an identifier for the received data file, and if the storage request includes user information and a storage service type, it may also allocate an identifier for the data file according to the user information and the storage service type.

According to this embodiment of the present invention, when the data file is split into multiple data slices, an identifier may be added for each data slice. When each data slice is split into multiple data blocks, an identifier may be added for each data block. When the check coding is performed on the data blocks by using a redundancy coding mechanism to generate check code, an identifier may be added for each check block. Sizes of the data slices, data blocks, or check blocks may be fixed or variable. For example, the redundancy algorithm may be an erasure coding algorithm.

120. Determine, by using a random algorithm, a first physical storage node corresponding to one data block or one check block of the M data blocks or the N check blocks, and determine at least M+1 different physical storage nodes based on the first physical storage node and according to a first sorting manner that conforms to a preset rule.

According to this embodiment of the present invention, the random algorithm may be a distributed hash table algorithm. For example, a mapping relationship between each key value and a storage node serial number may be preset in a distributed hash table.

130. Separately store at least M+1 blocks of the M data blocks and the N check blocks onto the at least M+1 different physical storage nodes, where K, M, and N are integers.

According to this embodiment of the present invention, M+1 data blocks and check blocks may be deployed on at least M+1 storage nodes, and other blocks except the at least M+1 blocks of the M data blocks and the N check blocks may be deployed randomly, so that when any physical storage node is faulty, data on the faulty physical storage node can be restored. This does not result in a data loss and improves the reliability of the distributed storage system.

In this embodiment of the present invention, a physical storage node corresponding to a data block of the data file can be determined by using the random algorithm, at least M+1 different physical storage nodes are determined based on the determined physical storage node and according to a rule-based sorting manner, and at least M+1 blocks of the M data blocks and the N check blocks are stored on the at least M+1 different physical storage nodes, so that the data blocks of the data slices can be deployed on storage nodes as different as possible according to the rule-based sorting manner, and a data loss that may result from a sing-point failure is reduced, thereby improving the reliability of the distributed storage system.

According to this embodiment of the present invention, in step 120, a hash calculation may be performed on an identifier of one data block or check block of the M data blocks or the N check blocks to generate a key value; and a physical storage node corresponding to one data block or check block of the M data blocks or the N check blocks is determined according to the key value, and the physical storage node is used as the first physical storage node.

For example, if the first physical storage node is used as a storage node corresponding to a first block of a data slice, physical storage nodes corresponding to other blocks of the data slice may be sequentially determined according to serial numbers of the physical storage nodes. Assuming that the serial number of the first physical storage node is 101, the serial numbers of the physical storage nodes corresponding to other blocks of the data slice may be 102, 103, 104, and the like.

Alternatively, as another embodiment, in step 120, the hash calculation may be performed on an identifier of a data slice that is split into M data blocks, so as to generate a key value; and a physical storage node corresponding to one data block or check block of the M data blocks or the N check blocks is determined according to the key value, and the physical storage node is used as the first physical storage node.

In other words, the key value may be calculated according to the identifier of the data slice or the identifier of any data block (for example, the first data block or check block) in the data slice.

For example, the hash calculation may be performed on an identifier of each data slice to obtain a key value of the data slice, the distributed hash table is searched for a physical storage node serial number corresponding to the key value, and one block of the M data blocks and N check blocks in the data slice is enabled to correspond to the physical storage node serial number. This embodiment of the present invention is not limited thereto. The physical storage node serial number corresponding to one block of the M data blocks and the N check blocks in the data slice may also be determined by using the distributed hash table and according to an identifier of a certain data block or check block in each data slice or other information that can identify the data slice.

For example, the determined physical storage node serial number may be used as the serial number of a physical storage node corresponding to the first data block or check block in the data slice, and serial numbers of physical storage nodes corresponding to other data blocks or check blocks in the data slice may be determined according to a sorting manner (for example, a sorting manner in an ascending or descending order) that conforms to the preset rule. The rule-based sorting manner is not limited in this embodiment of the present invention as long as the at least M+1 blocks are deployed on different physical storage nodes. The deployment may be performed in a global sequence or a partial sequence, for example, and may also be performed in an interleaved sorting manner, segmented-sequence sorting manner, or another sequence sorting manner at a fixed interval.

According to this embodiment of the present invention, in step 120, M+N different physical storage nodes are determined based on the first physical storage node and according to the first sorting manner, and in step 130, the M data blocks and the N check blocks can be separately stored on the M+N different physical storage nodes.

According to this embodiment of the present invention, M+N data blocks can be deployed on M+N physical storage nodes, and in this case, it can be ensured that the data slices of the data file are not lost when less than N physical storage nodes are faulty at the same time.

According to this embodiment of the present invention, in step 120, the first physical storage node may correspond to one block of the at least M+1 blocks, and physical storage nodes corresponding to other at least M blocks of the at least M+1 blocks are determined based on a position of the first physical storage node and according to the first sorting manner, where the M+1 different physical storage nodes include the first physical storage node.

For example, the first physical storage node may be the first block, the middle block, the last block, or any block of M+1 blocks. Using the first block of the M+1 blocks as an example and assuming that the serial number of the first physical storage node is 100, serial numbers of other M blocks are 101, 102, . . . , and 100+M.

Alternatively, as another embodiment, physical storage nodes corresponding to the at least M+1 blocks may also be determined based on the position of the first physical storage node and according to the first sorting manner, where the M+1 different physical storage nodes do not include the first physical storage node.

For example, the first physical storage node is 100, and the M+1 nodes are 110, 111, . . . , and 110+M.

According to this embodiment of the present invention, the different physical storage nodes are hard disks, and the number of the hard disks is greater than or equal to M+1.

In this case, it can be ensured that M+N data blocks and check blocks are deployed on different hard disks, thereby ensuring that a failure of any hard disk does not cause a data slice loss.

Alternatively, as another embodiment, the different physical storage nodes are servers, where the number of the servers is greater than or equal to M+1.

In this case, it can be ensured that M+N data blocks and check blocks are deployed on hard disks of different servers, thereby ensuring that a failure of any server does not cause a loss of a data slice.

Alternatively, as another embodiment, the different physical storage nodes are racks, where the number of the racks is greater than or equal to M+1.

In this case, it can be ensured that M+N data blocks and check blocks are deployed on hard disks of servers in different racks, thereby ensuring that a failure of any rack does not cause a data slice loss.

Alternatively, as another embodiment, the method in FIG. 1 further includes restoring data on the faulty physical storage node of the at least M+1 different physical storage nodes onto a hot standby storage node in a distributed storage system on which the physical storage node is located if one of the at least M+1 different physical storage nodes that store at least M+1 blocks of the M data blocks and the N check blocks is faulty.

For example, the serial number of the faulty physical storage node may be replaced with the serial number of the hot standby physical storage node, so as to migrate all data blocks or check blocks on the faulty physical storage node to the hot standby physical storage node.

Alternatively, as another embodiment, the method in FIG. 1 further includes sequentially migrating the Lth block of the M data blocks and the N check blocks that are sorted according to the first sorting manner and blocks prior to the Lth block to adjacent physical storage nodes along a first direction if a physical storage node of an Lth block of the M data blocks and the N check blocks that are sorted according to the first sorting manner and stored on the at least M+1 different physical storage nodes is faulty and if L is not greater than (M+N)/2, where the first direction is opposite to a direction of a sequence in the first sorting manner; and if L is greater than (M+N)/2, sequentially migrating the Lth block of the M data blocks and the N check blocks that are sorted according to the first sorting manner and blocks after the Lth block to adjacent physical storage nodes along a second direction, where the second direction is the same as the direction of the sequence in the first sorting manner.

In other words, when a physical storage node is faulty, only no more than (M+N)/2 data blocks and check blocks are migrated for each affected data slice. Therefore, the impact on other normal physical storage nodes is reduced, thereby reducing overhead for the distributed storage system to perform a calculation for fault recovery, improving a speed of data migration, and shortening time for the fault recovery.

Alternatively, as another embodiment, the method in FIG. 1 further includes sequentially migrating the Lth block of the M data blocks and the N check blocks that are sorted according to the first sorting manner and blocks prior to the Lth block to adjacent physical storage nodes along the first direction if the physical storage node of the Lth block of the M data blocks and the N check blocks that are sorted according to the first sorting manner and stored on the at least M+1 different physical storage nodes is faulty.

Alternatively, as another embodiment, the method in FIG. 1 further includes sequentially migrating the Lth block of the M data blocks and the N check blocks that are sorted according to the first sorting manner and blocks after the Lth block to adjacent physical storage nodes along the second direction if the physical storage node of the Lth block of the M data blocks and the N check blocks that are sorted according to the first sorting manner and stored on the at least M+1 different physical storage nodes is faulty.

According to this embodiment of the present invention, fault recovery is performed by migrating, forward or backward, data blocks or check blocks stored on a faulty physical storage node, so that data blocks or check blocks of a data slice can still be deployed on different physical storage nodes, thereby ensuring the reliability of the distributed storage system after the fault recovery.

Alternatively, as another embodiment, the method in FIG. 1 further includes migrating the Pth block of the M data blocks and the N check blocks that are sorted according to the first sorting manner to the new physical storage node if a new physical storage node is added after a physical storage node of a Pth block of the M data blocks and the N check blocks that are sorted according to the first sorting manner and stored on the at least M+1 different physical storage nodes and if P is not greater than (M+N)/2, and sequentially migrating blocks prior to the Pth block of the M data blocks and the N check blocks that are sorted according to the first sorting manner to adjacent physical storage nodes along a first direction, where the first direction is the same as the direction of the sequence in the first sorting manner; and if P is greater than (M+N)/2, migrating a (P+1)th block of the M data blocks and the N check blocks that are sorted according to the first sorting manner to the new physical storage node, and sequentially migrating blocks after the (P+1)th block of the M data blocks and the N check blocks that are sorted according to the first sorting manner to adjacent physical storage nodes along a second direction, where the second direction is opposite to the direction of the sequence in the first sorting manner, and P is an integer.

Because only no more than (M+N)/2 data blocks and check blocks are migrated on each affected data slice, the speed of data migration can be improved, thereby shortening time of a capacity expansion process.

Alternatively, as another embodiment, the method in FIG. 1 further includes migrating the Pth block of the M data blocks and the N check blocks that are sorted according to the first sorting manner to the new physical storage node if a new physical storage node is added after the physical storage node of the Pth block of the M data blocks and the N check blocks that are sorted according to the first sorting manner and stored on the at least M+1 different physical storage nodes, and sequentially migrating blocks prior to the Pth block of the M data blocks and the N check blocks that are sorted according to the first sorting manner to adjacent physical storage nodes along the first direction.

Alternatively, as another embodiment, the method in FIG. 1 further includes migrating the (P+1)th block of the M data blocks and the N check blocks that are sorted according to the first sorting manner to the new physical storage node if a new physical storage node is added after the physical storage node on which the Pth block of the M data blocks and the N check blocks that are sorted according to the first sorting manner and stored on the at least M+1 different physical storage nodes is located, and sequentially migrating blocks after the (P+1)th block of the M data blocks and the N check blocks that are sorted according to the first sorting manner to adjacent physical storage nodes along the second direction.

According to this embodiment of the present invention, capacity expansion is performed by migrating, forward or backward, data blocks or check blocks stored on physical storage nodes, so that data blocks or check blocks of a data slice can still be deployed on different physical storage nodes, thereby ensuring the reliability of the distributed storage system after the capacity expansion.

Alternatively, as another embodiment, the method in FIG. 1 further includes: determining, by using the random algorithm, the first physical storage node corresponding to one data block or check block of the M data blocks or the N check blocks when the data file needs to be read; determining at least M different physical storage nodes based on the determined first physical storage node and according to the first sorting manner; reading at least M blocks from the at least M different physical storage nodes, where the read M blocks include the M data blocks or include some data blocks of the M data blocks and some check blocks of the N check blocks; and performing decoding and a reverse check on the at least M blocks to generate M decoded data blocks, and combining the M decoded data blocks to generate the data file.

According to this embodiment of the present invention, the method for reading the data file is just opposite to the method for storing the data file. For example, the distributed storage system may receive a read request sent by the user through the client, authenticate the user according to the identity information of user, where the identity information is carried in the read request, and allow the user to read the data file only after the authentication succeeds. This is not limited in this embodiment of the present invention. For example, the user may directly read the data file without the need of authentication.

The distributed storage system in this embodiment of the present invention may allocate an identifier for the data file to be read, and if the read request includes the user information and the storage service type, it may also allocate an identifier for the data file according to the user information and the storage service type.

The distributed storage system in this embodiment of the present invention may determine, by using the distributed hash table and according to an identifier allocated for each data slice of the data file when the data file is stored, a physical storage node corresponding to each data slice.

The distributed storage system in this embodiment of the present invention may use a determined physical storage node as a physical storage node corresponding to a certain data block or check block of a data slice, and serial numbers of physical storage nodes corresponding to other data blocks or check blocks in the data slice may be determined according to an ascending rule.

According to this embodiment of the present invention, the data file may be acquired from the outside of the distributed storage system.

Alternatively, as another embodiment, the data file may be acquired from some physical storage nodes of the distributed storage system.

According to this embodiment of the present invention, the redundancy algorithm is the erasure coding algorithm, and the random algorithm is the distributed hash table algorithm.

According to this embodiment of the present invention, the different physical storage nodes are different physical storage nodes on the distributed storage system, each physical storage node of the different physical storage nodes includes multiple virtual storage nodes, and virtual storage nodes with consecutive serial numbers are deployed on the different physical storage nodes according to a second sorting manner that conforms to the preset rule.

The determining, by using the random algorithm, the first physical storage node corresponding to one block of the M data blocks and the N check blocks, and determining the at least M+1 different physical storage nodes based on the determined first physical storage node and according to the first sorting manner includes determining, by using the random algorithm, serial number of a first virtual storage node corresponding to one block of the M data blocks and the N check blocks, and determining serial numbers of at least M+1 virtual storage nodes based on the serial number of the first virtual storage node and according to the first sorting manner; and the storing the at least M+1 blocks of the M data blocks and the N check blocks onto the at least M+1 different physical storage nodes includes storing the at least M+1 blocks of the M data blocks and the N check blocks onto virtual storage nodes corresponding to the serial numbers of the at least M+1 virtual storage nodes.

For example, each hard disk on the physical storage nodes may be split into multiple partitions, that is, multiple virtual nodes, and T virtual nodes with consecutive serial numbers in the multiple virtual nodes may also be deployed on different hard disks of the distributed storage system according to the rule-based sorting manner.

The second sorting manner that conforms to the preset rule may be the same as or different from the first sorting manner that conforms to the preset rule, and if the second sorting manner is different from the first sorting manner, the first sorting manner and the second sorting manner need to jointly meet the condition that data blocks or check blocks are deployed on different physical storage nodes of the distributed storage system. For example, the first sorting manner is the interleaved sorting manner, and the second sorting manner is the sequence sorting manner. In other words, serial numbers of virtual nodes correspond to serial numbers of different physical storage nodes by using a sequence sorting method, and serial numbers of data blocks or check blocks correspond to the serial numbers of the virtual nodes by using an interleaved sorting method. This can also ensure that the data blocks and the check blocks are deployed on physical storage nodes as different as possible.

Different from a conventional method for distributing minimum blocks of data by using the distributed hash table to implement random distribution of data blocks, in this embodiment of the present invention, a method for distributing data with two steps is adopted. In the first step, random distribution is performed on data slices (or a certain data block of each data slice) by using the distributed hash table; in the second step, data blocks and check blocks included in each data slice are stored in a rule-based deployment manner, where the rule-based deployment manner may be global-sequence deployment, partial-sequence deployment, interleaved deployment, or segmented-sequence deployment, and a deployment principle may be used with a sorting algorithm of virtual nodes on a hard disk, so that data blocks and check blocks of each data slice are deployed on different physical storage nodes. The physical storage nodes according to this embodiment of the present invention may be defined as hard disks, servers, or racks according to a user requirement, so as to avoid that data in the distributed storage system is invalid due to a failure of a hard disk, a server, or a rack.

The following describes embodiments of the present invention in detail with reference to specific examples.

Figure 2:
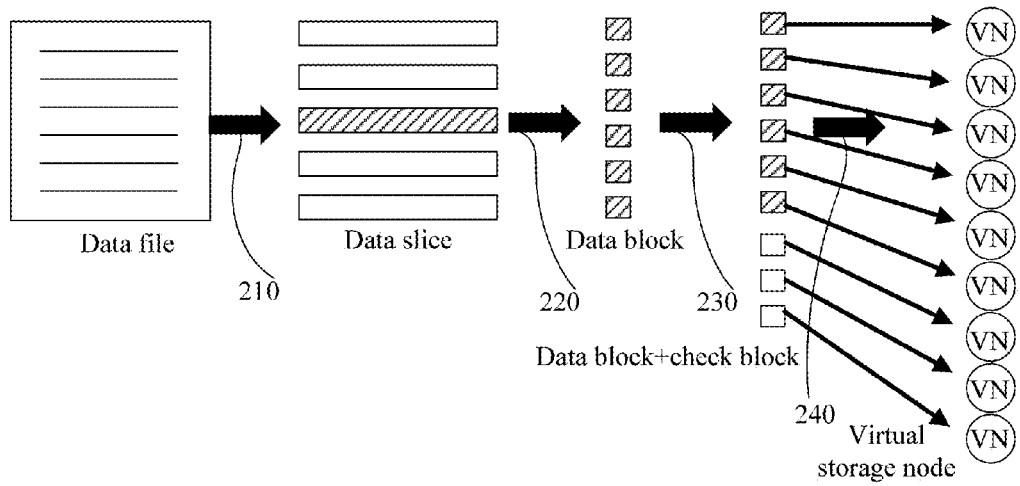
FIG. 2 is a schematic diagram of a process in which a distributed storage system splits and stores a data file according to an embodiment of the present invention.

FIG. 2 is a schematic diagram of a process in which a distributed storage system splits and stores a data file according to an embodiment of the present invention. For clarity, FIG. 2 illustrates only 5 data slices and illustrates only 6 data blocks, 3 check blocks, and 9 virtual nodes for one data slice.

210: Split a data file to generate K (for example, 5) data slices.

220: Further split a data slice with a smaller granularity to generate M (for example, 6) data blocks.

230: Add N (for example, 3) check blocks by using a redundancy coding algorithm.

240: Obtain, by using a result of a hash calculation, serial number of a virtual node corresponding to the data slice; obtain, based on the serial number of the virtual node and according to a rule-based sorting manner, serial numbers of virtual nodes corresponding to the M data blocks and the N check blocks; and finally sequentially store the M data blocks and the N check blocks onto M+N (for example, 9) virtual nodes VN.

It should be noted that as another embodiment, a virtual node in this embodiment may be replaced with a physical storage node, and serial number of the virtual node may be replaced with serial number of the physical storage node. No further details are provided herein.

Figure 3:
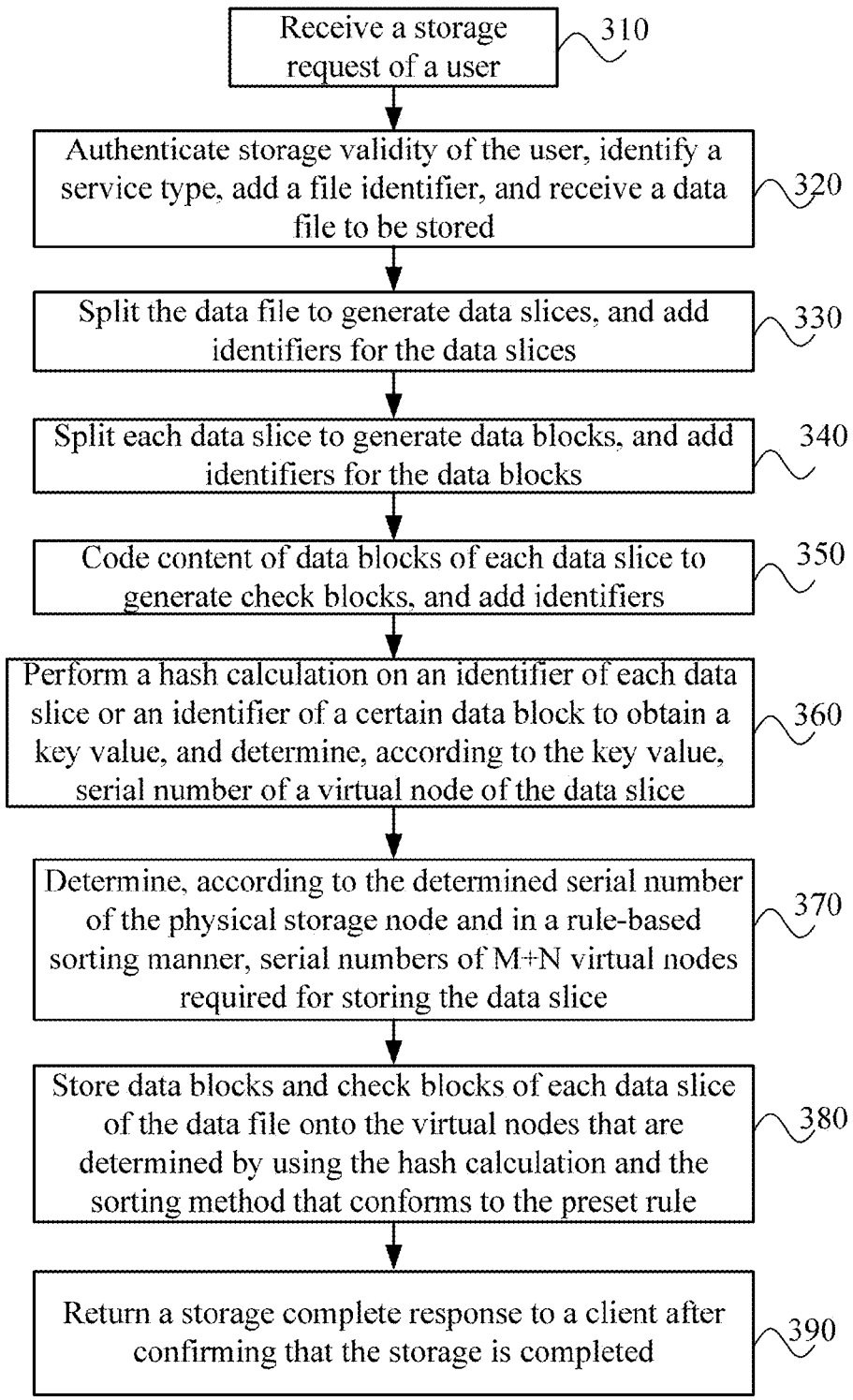
FIG. 3 is a schematic flowchart of a distributed storage process according to an embodiment of the present invention.

FIG. 3 is a schematic flowchart of a distributed storage process according to an embodiment of the present invention. The method in FIG. 3 may be executed by a distributed storage system. The method in FIG. 3 may include the following content:

According to this embodiment of the present invention, during setting and distribution of virtual nodes (that is, partitions) of the distributed storage system, distribution of the virtual nodes can meet the condition that consecutive virtual nodes are not on a same physical storage node; for example, partitions Partition (k), Partition (k−1), and Partition (k+1) are deployed on three different hard disks, servers, or racks.

310. Receive a storage request of a user.

For example, the distributed storage system may receive a read request sent by the user through a client. The read request may carry identity information of the user.

320. Authenticate storage validity of the user, identify a service type, add a file identifier, and receive a data file to be stored.

For example, whether the user is an authorized user is authenticated first, and after it is authenticated that the user is an authorized user, an identifier of the data file is allocated, and the data file to be stored is received. For example, the identifier of the data file may be "file name+author information+time information+version serial number".

330. Split each data file to generate data slices, and add an identifier for each data slice.

For example, a data file may be split into K data slices, an identifier is added for each data slice, and the identifier may include the identifier of the data file+serial number of the data slice.

340. Split each data slice to generate data blocks, and add an identifier for each data block.

For example, a data slice may be split into M data blocks, an identifier is added for each data block, for example, the identifier may include an identifier of the data slice+serial number of the data block.

350. Code content of data blocks of each data slice to generate check blocks, and add identifiers.

For example, cyclic check coding is performed on content of M data blocks of a data slice to generate N check blocks, and an identifier is added for each check block; for example, the identifier may include the identifier of the data slice+serial number of the check block.

360. Perform a hash calculation on an identifier of each data slice or an identifier of a certain data block to obtain a key value, and determine, according to the key value, serial number of a virtual node corresponding to the data slice.

The distributed storage system may externally provide storage, reading, and deletion functions based on a distributed hash table. The distributed hash table may include a mapping relationship between a key value and a virtual node serial number. Each piece of stored or read data has a unique identifier in the whole cluster.

According to this embodiment of the present invention, the hash calculation may be performed according to an identifier of a data slice to generate a key value, and serial number of a virtual storage node corresponding to the data slice and a deployment position of a physical unit on which the virtual node is located are determined according to the key value.

Alternatively, according to this embodiment of the present invention, the hash calculation may also be performed according to an identifier of a first data block of the data slice or an identifier of any data block of the data slice to generate a key value, and serial number of a virtual node corresponding to the data slice is determined by searching the distributed hash table according to the key value.

370. Determine, according to the determined serial number of the virtual storage node and in a rule-based sorting manner, serial numbers of M+N virtual nodes required for storing the data slice.

Serial numbers of other M+N−1 virtual nodes, that is, serial numbers of N+M virtual nodes in total are obtained according to the serial number of the virtual node obtained in step 360 and by using a rule-based sorting algorithm (for example, sequence sorting, interval sorting, and segmented sequence). Using sequence deployment as an example, M+N data blocks and check blocks are deployed on M+N consecutive virtual nodes, and the M+N consecutive virtual nodes are deployed on physical storage nodes independent of each other. Assuming that the first block of a data slice corresponds to the virtual node serial number 100, the second block corresponds to a virtual node serial number 101, and so on.

The virtual node whose serial number is 100 and the virtual node whose serial number is 101 are distributed on different physical storage nodes, and therefore the first block and the second block of the data slice can be stored on different physical storage nodes.

380. Store data blocks and check blocks of each data slice of the data file onto the virtual nodes that are determined by using the hash calculation and in the rule-based sorting manner.

For example, an identifier of a data slice of a file to be stored may be a character string, and values 1-10000 (that is, key values) may be obtained after a hash calculation is performed. Using 100 as an interval, 1-100 are placed on partition A, 100-200 are on the next partition B, and 200-300 are on another partition C. For example, when a key value of an identifier of a data slice is 1, 2, 50, or 99, partition A is selected as a storage position of one block (for example, the first block) of the data slice, and other data blocks are stored on other different hard disks according to the rule-based sorting manner defined in this embodiment of the present invention.

According to this embodiment of the present invention, all virtual nodes in the distributed storage system may compose a logical ring. For example, a system has 100 disks, each disk has 100 virtual nodes (partitions), and in this case, 10000 virtual nodes form a logical ring. Virtual nodes, that is, serial numbers of virtual nodes, distributed on hard disk 1 are 1, 101, 201, 301, 401, 501, 601, 701, 801, 901, and so on. In this embodiment of the present invention, N+M data blocks may be sequentially deployed on the 10000 virtual nodes.

Alternatively, in this embodiment of the present invention, consecutive deployment may also be performed partially. For example, 50 virtual nodes are used as a partial segment. The N+M data blocks and check blocks are sequentially deployed on the 50 virtual nodes. Assuming that 12+3 data blocks and check blocks start from the partition whose serial number is 45, the data blocks and check blocks may be sequentially deployed on virtual nodes whose serial numbers are 45, 46, 47, 48, 49, 50, 1, 2, 3, 4, 5, 6, 7, 8, and 9.

390. Return a storage complete response to the client after confirming that the storage is completed.

According to this embodiment of the present invention, when data is distributed on physical storage nodes, a mapping method with two steps is adopted, that is, a "random+orderly" manner in which a data slice is deployed randomly in the first step, and data blocks are deployed according to a rule in the second step. In this embodiment of the present invention, it can be ensured that the data blocks are stored (or deployed) on different hard disks. Therefore, data of the data slice still exists or can be restored when any hard disk is invalid, thereby avoiding a data loss caused by a failure of a single physical unit disk, and greatly improving the data storage reliability.

According to this embodiment of the present invention, the rule-based sorting manner adopted during data block storage may match the rule-based sorting manner of the virtual nodes, for example, consecutive virtual nodes are distributed on different hard disks, and data blocks stored on the consecutive virtual nodes can ensure that the data blocks are stored on different hard disks. If the virtual nodes are distributed on different hard disks by using an interleaving or jumping algorithm, a distribution rule of the data blocks may also be adjusted correspondingly, but data blocks of a same data slice are always kept to be distributed on different hard disks. It should be understood that any rule-based sorting manners that are used together to allow data blocks to be distributed on different hard disks shall fall within the protection scope of the present invention.

It should be noted that as another embodiment, a virtual node in the embodiment in FIG. 3 may be replaced with a physical storage node, and serial number of the virtual node may be replaced with serial number of the physical storage node. No further details are provided herein.

Figure 4:
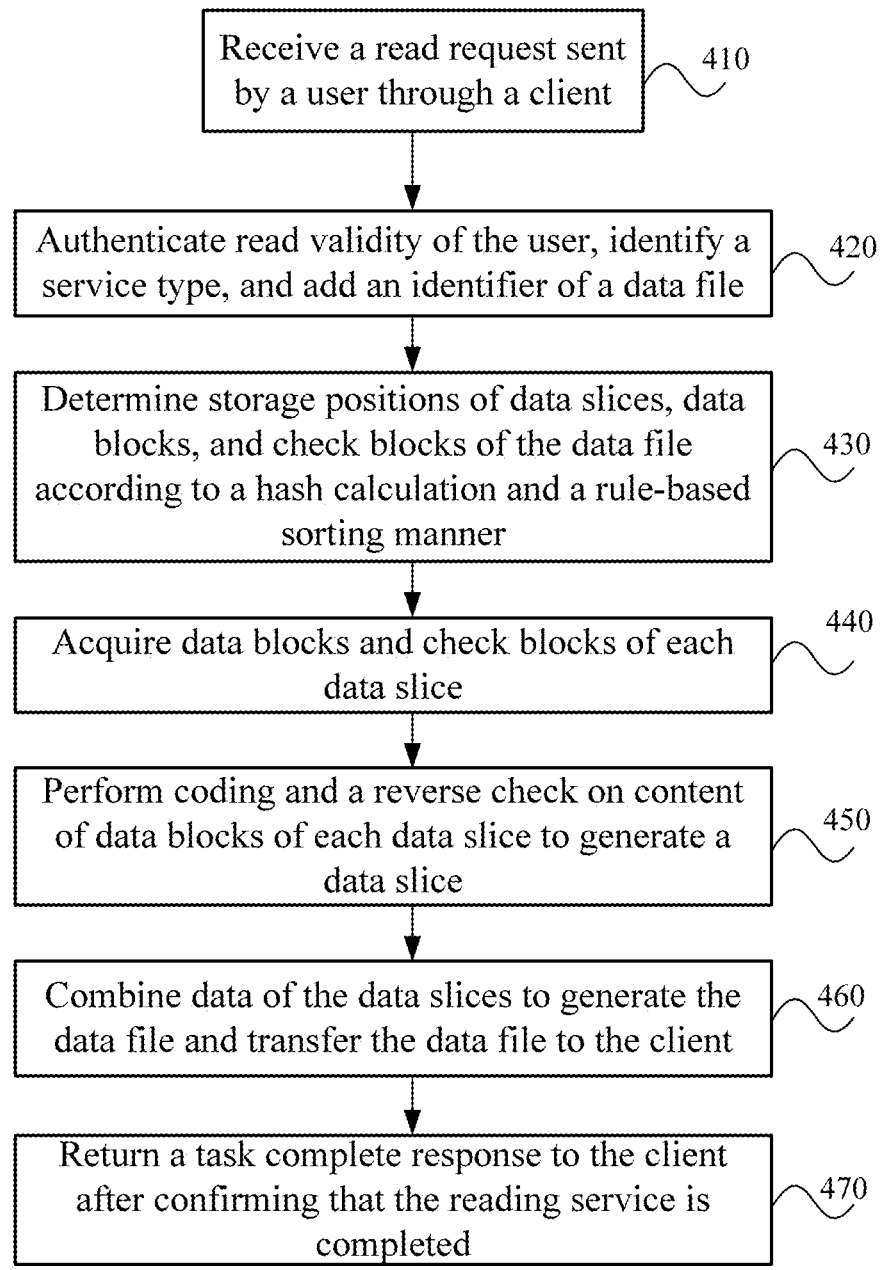
FIG. 4 is a schematic flowchart of a distributed storage process according to an embodiment of the present invention.

FIG. 4 is a schematic flowchart of a distributed storage process according to an embodiment of the present invention. The method in FIG. 4 may be executed by a distributed storage system. The reading method in FIG. 4 corresponds to the storage method in FIG. 3, and some detailed descriptions are not provided herein. The method in FIG. 4 includes the following content:

410. Receive a read request of a user.

For example, the distributed storage system may receive a read request sent by the user through a client. The read request may carry identity information of the user.

420. Authenticate read validity of the user, identify a service type, and add an identifier of a data file.

For example, whether the user is an authorized user is authenticated first, and after it is authenticated that the user is an authorized user, an identifier of a data file to be read is determined according to a storage service type and customer information, for example, the identifier of the data file may be "file name+author information+time information+version serial number". The distributed storage system may determine identifiers of data slices of the data file according to a record that is generated when the data file is stored.

430. Determine storage positions of the data slices, data blocks, and check blocks of the data file according to a hash calculation and a rule-based sorting manner.

For example, the hash calculation is performed according to a determined identifier of each data slice to generate a key value, and serial number of a virtual node of the data slice is determined according to the key value. Accordingly, the hash calculation may also be performed according to an identifier of the first data block of the data slice or an identifier of a certain data block to generate a key value, and serial number of a virtual node of the data slice is determined according to the key value, that is, serial number of a virtual node corresponding to a certain data block (for example, the first data block) of the data slice is determined. Serial numbers of other M+N−1 virtual nodes, that is, serial numbers of M+N virtual nodes in total are obtained according to the serial number of the virtual node (that is, a position of the virtual node) and by using a rule-based sorting algorithm (for example, sequence sorting, interval sorting, and segmented sequence).

440. Acquire data blocks and check blocks of each data slice.

The data blocks and check blocks are read, according to the obtained serial numbers of the M+N virtual nodes, from the virtual nodes corresponding to the serial numbers of the virtual nodes.

450. Perform coding and a reverse check on the read data blocks and check blocks to obtain data blocks, and combine the data blocks to generate data slices.

460. Combine the data slices to obtain the data file.

470. Return a reading complete response to the client after confirming that the reading of the data file is completed.

FIG. 5A is a schematic diagram of storage positions of some data slices when a hard disk of a distributed storage system is faulty according to an embodiment of the present invention. FIG. 5B is a schematic diagram of storage positions of some data slices of a distributed storage system after fault recovery according to an embodiment of the present invention. FIG. 5C is a schematic diagram of storage positions of some data slices of a distributed storage system after fault recovery according to another embodiment of the present invention. The following uses a physical storage node being a hard disk as an example for description.

Referring to FIG. 5A, each data slice has 6 data blocks and 3 check blocks, that is, 9 blocks in total, and the 9 blocks are sequentially numbered. A block whose serial number is 1 of data slice 1 is deployed on hard disk i, a block whose serial number is 2 of data slice 2 is deployed on hard disk i, and so on. A block whose serial number is 9 of data slice 9 is deployed on hard disk i, and other blocks of each data slice are sequentially deployed on different hard disks by analog. In this embodiment, it is assumed that hard disk i is faulty.

Referring to FIG. 5B, a certain number of hot standby hard disks are reserved in the distributed storage system, and when a hard disk is faulty, a hot standby hard disk is adopted to directly replace serial number of the faulty disk. For example, when hard disk i is faulty, data on the faulty hard disk i is restored on a new hard disk i'. The number of hot standby hard disks may be determined according to hard disk reliability, for example, a higher reliability requirement requires a larger number of hot standby hard disks.

Referring to FIG. 5C, when hard disk i is faulty, a certain data block of the data slices is deployed on hard disk i, and serial numbers of the data blocks are 1 to 9; data restoration is performed by adopting the method of sequentially migrating blocks whose serial numbers not greater than 9/2 forward and sequentially migrating other blocks backward according to different serial numbers of the blocks deployed on hard disk i. In this case, the amount of migrated data is the smallest, and orderly deployment of the data blocks can still be retained, thereby achieving a best match of performance and reliability. The following uses M+N adopting 6+3 coding protection as an example for description. A migrating forward and backward rule of actual data is adjusted according to the total number of blocks, following the principle of meeting the condition that the amount of migrated data is the smallest.

For data slice 1, when the block whose serial number is 1 is lost, the block whose serial number is 1 can be calculated and restored according to other 8 blocks, and the block whose serial number is 1 can be restored onto hard disk i−1 because 1 is not greater than (6+3)/2; for data slice 2, when the block whose serial number of 2 is lost, the block whose serial number is 2 can be calculated and restored according to other 8 blocks, and because 2 is not greater than (6+3)/2, the block whose serial number is 1 can be migrated forward from hard disk i−1, that is, migrated to hard disk i−2, and the block whose serial number is 2 is restored onto hard disk i−1, and so on. Further, for data slice 5, when the block whose serial number is 5 is lost, the block whose serial number is 5 can be calculated and restored according to other 8 blocks, and because 5 is greater than (6+3)/2, the block whose serial number is 5 can be restored onto hard disk i+1, and the blocks whose serial numbers are 6, 7, 8, and 9 are sequentially migrated backward from hard disk i+1, hard disk i+2, hard disk i+3, and hard disk i+4, that is, migrated to hard disk i+2, hard disk i+3, hard disk i+4, and hard disk i+5, and so on.

It should be understood that in the foregoing specific embodiment, a physical storage node being a hard disk is used as an example for description, and the fault recovery method in the foregoing embodiment also applies to a scenario in which the physical storage node is a server or a rack, and no further details are provided herein.

Figures 6B, 7:
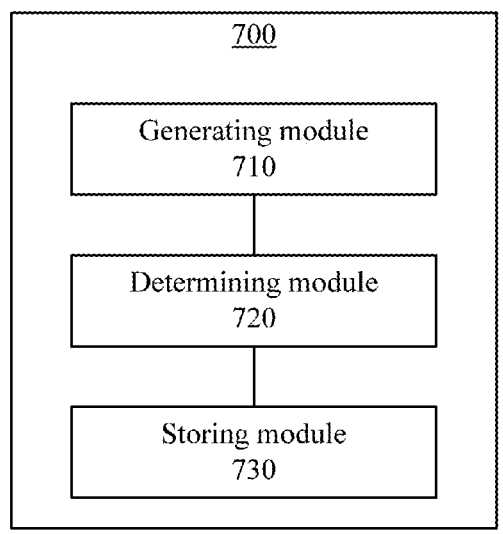
FIG. 6B is a schematic diagram of storage positions of some data slices after capacity expansion is performed for a distributed storage system according to an embodiment of the present invention.
FIG. 7 is a schematic structural diagram of a distributed storage apparatus according to an embodiment of the present invention.

FIG. 6A is a schematic diagram of storage positions of some data slices when capacity expansion is performed for a distributed storage system according to an embodiment of the present invention. FIG. 6B is a schematic diagram of storage positions of some data slices after capacity expansion is performed for a distributed storage system according to an embodiment of the present invention.

When capacity expansion is performed for the distributed storage system, the capacity expansion can be performed by adopting a method opposite to the fault recovery method in FIG. 5B if only a small number of hard disks are added; for example, a percentage of the number of added hard disks in the total number of hard disks is less than a specific threshold. For example, serial number of a hard disk may be added, and some data blocks and/or check blocks of an adjacent hard disk are migrated onto the newly added hard disks by adopting a migrating forward or backward method, so as to ensure rule-based deployment of the data blocks and check blocks.

For example, referring to FIG. 6A, each data slice has 6 data blocks and 3 check blocks, that is, 9 blocks in total, and the 9 blocks are sequentially numbered. The block whose serial number is 1 of data slice 1 is deployed on hard disk i, the block whose serial number is 2 of data slice 2 is deployed on hard disk i, and so on. The block whose serial number is 9 of data slice 9 is deployed on hard disk i, and other blocks of each data slice are sequentially deployed on different hard disks by analog. In this embodiment, it is assumed that hard disk i' is added between hard disk i and hard disk i+1 of the distributed storage system.

Referring to FIG. 6B, when hard disk i' is added after a block whose serial number is 1 of data slice 1, because 1 is not greater than (6+3)/2, the block whose serial number is 1 is migrated backward from hard disk i, that is, migrated to hard disk i'; when hard disk i is added after a block whose serial number is 2 of data slice 2, because 2 is not greater than (6+3)/2, the block whose serial number is 2 is migrated backward from hard disk i, that is, migrated to hard disk i, and the block whose serial number is 1 is migrated backward from hard disk i−1, that is, migrated to hard disk i, and so on. Further, because hard disk i' is added after a block whose serial number is 5 of data slice 5, because 5 is greater than (6+3)/2, the blocks whose serial numbers are 6, 7, 8, and 9 of data slice 5 are sequentially migrated forward, that is, migrated from hard disk i+1, hard disk i+2, hard disk i+3, and hard disk i+4 to hard disk i', hard disk i+1, hard disk i+2, and hard disk i+3, and so on.

Alternatively, as another embodiment, when large-scale capacity expansion is performed for a system, for example, the percentage of the number of added hard disks in the total number of hard disks is greater than a specific threshold, the added hard disks may be combined into a new storage function domain, and in the new storage function domain, data mapping is performed by adopting a method similar to the mapping method with two steps in the foregoing embodiment. This effectively divides a distributed storage system into different failure domains in addition to ensuring that the mapping method with two steps is still valid, thereby improving the data reliability of the whole system.

Alternatively, as another embodiment, when large-scale capacity expansion is performed for a system, virtual nodes may be redeployed on all hard disks (including hard disks before the capacity expansion and newly added hard disks) according to an original rule-based sorting manner, and necessary data migration is performed, so that the system after the capacity expansion still meets a requirement of rule-based sorting before the capacity expansion is performed for the system, thereby reducing the difficulty and workload of subsequent maintenance, and ensuring the data reliability of the system. In this case, the data migration process is equivalent to acquiring data from an original distributed storage system (that is, a part of a new distributed storage system after the capacity expansion) and redeploying the data on the new distributed storage system according to the method in this embodiment of the present invention.

It should be understood that in the foregoing specific embodiment, a physical storage node being a hard disk is used as an example for description, and the capacity expansion method in the foregoing embodiment also applies to a scenario in which the physical storage node is a server or a rack, and no further details are provided herein.

The foregoing describes the distributed storage method according to the embodiments of the present invention, and the following describes a distributed storage apparatus according to embodiments of the present invention with reference to FIG. 7 to FIG. 12.

FIG. 7 is a schematic structural diagram of a distributed storage apparatus 700 according to an embodiment of the present invention. The distributed storage apparatus 700 includes a generating module 710, a determining module 720, and a storing module 730.

The generating module 710 splits a data file to generate K data slices, splits each data slice of the K data slices to generate M data blocks for each data slice, and performs check coding on the M data blocks by using a redundancy algorithm to generate N check blocks. The determining module 720 determines, by using a random algorithm, a first physical storage node corresponding to one data block or one check block of the M data blocks or the N check blocks, and determines at least M+1 different physical storage nodes based on the first physical storage node and according to a first sorting manner that conforms to a preset rule. The storing module 730 stores at least M+1 blocks of the M data blocks and the N check blocks onto the at least M+1 different physical storage nodes, where K, M, and N are integers.

In this embodiment of the present invention, a storage node corresponding to one data block of the data file can be determined by using the random algorithm, at least M+1 different storage nodes are determined based on the determined storage node and according to a rule-based sorting manner, and the at least M+1 blocks of the M data blocks and the N check blocks are stored on the at least M+1 different storage nodes, so that data blocks of data slices can be deployed on storage nodes as different as possible according to the rule-based sorting manner, and a data loss that may result from a sing-point failure is reduced, thereby improving the reliability of a distributed storage system.

For operations and functions of each module of the distributed storage apparatus 700, reference may be made to steps 110, 120, and 130 of the method in FIG. 1. No further details are provided herein to avoid repetition.

Figure 8:
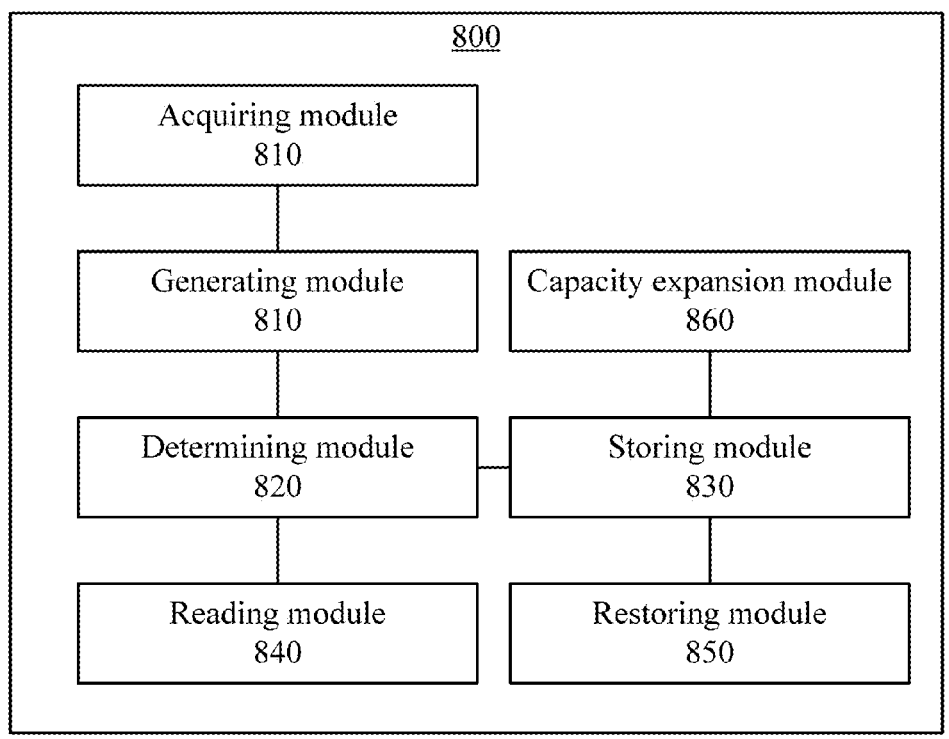
FIG. 8 is a schematic structural diagram of a distributed storage apparatus according to an embodiment of the present invention.

FIG. 8 is a schematic structural diagram of a distributed storage apparatus 800 according to an embodiment of the present invention. The distributed storage apparatus 800 includes a generating module 810, a determining module 820, and a storing module 830. The generating module 810, the determining module 820, and the storing module 830 are similar to the generating module 710, the determining module 720, and the storing module 730 in FIG. 7, and no further details are provided herein.

According to this embodiment of the present invention, the determining module 820 performs a hash calculation on an identifier of one data block or check block of M data blocks or N check blocks to generate a key value, determines, according to the key value, a physical storage node corresponding to one data block or check block of the M data blocks or the N check blocks, and uses the physical storage node as a first physical storage node.

According to this embodiment of the present invention, a first rule-based sorting manner is a global-sequence sorting manner, a partial-sequence sorting manner, an interleaved sorting manner, or a segmented-sequence sorting manner.

According to this embodiment of the present invention, the determining module 820 is configured to perform a hash calculation on an identifier of a data slice that is split into M data blocks, so as to generate a key value, determine, according to the key value, a physical storage node corresponding to one data block or check block of the M data blocks or the N check blocks, and use the physical storage node as the first physical storage node.

According to this embodiment of the present invention, the determining module 820 determines M+N different physical storage nodes based on the first physical storage node and according to the first sorting manner, and the storing module 830 separately stores the M data blocks and the N check blocks onto the M+N different physical storage nodes.

According to this embodiment of the present invention, the determining module 820 maps the first physical storage node to one block of the at least M+1 blocks, and determines, based on a position of the first physical storage node and according to the first sorting manner, physical storage nodes corresponding to other at least M blocks of the at least M+1 blocks, where the M+1 different physical storage nodes include the first physical storage node.

Alternatively, as another embodiment, the determining module 820 determines, based on a position of a first physical storage node and according to a first sorting manner, physical storage nodes corresponding to at least M+1 blocks, where M+1 different physical storage nodes do not include the first physical storage node.

According to this embodiment of the present invention, the different physical storage nodes are hard disks, and the number of the hard disks is greater than M+1.

Alternatively, as another embodiment, different physical storage nodes are servers, where the number of the servers is greater than M+1.

Alternatively, as another embodiment, different physical storage nodes are racks, where the number of the racks is greater than M+1.

Alternatively, as another embodiment, the distributed storage apparatus 800 further includes a restoring module 850. The restoring module 850 is configured to, if one of at least M+1 different physical storage nodes that store at least M+1 blocks of M data blocks and N check blocks is faulty, restore data on the faulty physical storage node of the at least M+1 different physical storage nodes onto a hot standby storage node in a distributed storage system on which the physical storage node is located.

Alternatively, as another embodiment, the distributed storage apparatus 800 further includes a restoring module 850.

The restoring module 850 is configured to, if a physical storage node of an Lth block of M data blocks and N check blocks that are sorted according to a first sorting manner and stored on at least M+1 different physical storage nodes is faulty and if L is not greater than (M+N)/2, sequentially migrate the Lth block of the M data blocks and the N check blocks that are sorted according to the first sorting manner and blocks prior to the Lth block to adjacent physical storage nodes along a first direction, where the first direction is opposite to a direction of a sequence in the first sorting manner; and if L is greater than (M+N)/2, sequentially migrate the Lth block of the M data blocks and the N check blocks that are sorted according to the first sorting manner and blocks after the Lth block to adjacent physical storage nodes along a second direction, where the second direction is the same as the direction of the sequence in the first sorting manner.

Alternatively, as another embodiment, the restoring module 850 sequentially migrates, if a physical storage node of an Lth block of M data blocks and N check blocks that are sorted according to a first sorting manner and stored on at least M+1 different physical storage nodes is faulty, the Lth block of the M data blocks and the N check blocks that are sorted according to the first sorting manner and blocks prior to the Lth block to adjacent physical storage nodes along a first direction.

Alternatively, as another embodiment, the restoring module 850 sequentially migrates, if a physical storage node of an Lth block of M data blocks and N check blocks that are sorted according to a first sorting manner and stored on at least M+1 different physical storage nodes is faulty, the Lth block of the M data blocks and the N check blocks that are sorted according to the first sorting manner and blocks after the Lth block to adjacent physical storage nodes along a second direction.

Alternatively, as another embodiment, the distributed storage apparatus 800 further includes a capacity expansion module 860.

The capacity expansion module 860 migrates, if a new physical storage node is added after a physical storage node of a Pth block of M data blocks and N check blocks that are sorted according to a first sorting manner and stored on at least M+1 different physical storage nodes and if P is not greater than (M+N)/2, the Pth block of the M data blocks and the N check blocks that are sorted according to the first sorting manner to the new physical storage node, and sequentially migrates blocks prior to the Pth block of the M data blocks and the N check blocks that are sorted according to the first sorting manner to adjacent physical storage nodes along a first direction, where the first direction is the same as a direction of a sequence in the first sorting manner; and if P is greater than (M+N)/2, migrates a (P+1)th block of the M data blocks and the N check blocks that are sorted according to the first sorting manner to the new physical storage node, and sequentially migrates blocks after the (P+1)th block of the M data blocks and the N check blocks that are sorted according to the first sorting manner to adjacent physical storage nodes along a second direction, where the second direction is opposite to the direction of the sequence in the first sorting manner, and P is an integer.

Alternatively, as another embodiment, the capacity expansion module 860 is configured to, if a new physical storage node is added after a physical storage node of a Pth block of M data blocks and N check blocks that are sorted according to a first sorting manner and stored on at least M+1 different physical storage nodes, migrate the Pth block of the M data blocks and the N check blocks that are sorted according to the first sorting manner to the new physical storage node, and sequentially migrate blocks prior to the Pth block of the M data blocks and the N check blocks that are sorted according to the first sorting manner to adjacent physical storage nodes along a first direction.

Alternatively, as another embodiment, the capacity expansion module 860 migrates, if a new physical storage node is added after a physical storage node on which a Pth block of M data blocks and N check blocks that are sorted according to a first sorting manner and stored on at least M+1 different physical storage nodes is located, a (P+1)th block of the M data blocks and the N check blocks that are sorted according to the first sorting manner to the new physical storage node, and sequentially migrates blocks after the (P+1)th block of the M data blocks and the N check blocks that are sorted according to the first sorting manner to adjacent physical storage nodes along a second direction.

Alternatively, as another embodiment, the determining module 820 is further configured to, when a data file needs to be read, determine, by using a random algorithm, a first physical storage node corresponding to one data block or check block of M data blocks or N check blocks, and determine at least M different physical storage nodes based on the determined first physical storage node and according to a first sorting manner, where the distributed storage apparatus 800 further includes a reading module 840. The reading module 840 is configured to read at least M blocks from the M different physical storage nodes, where the read M blocks include the M data blocks or include some data blocks of the M data blocks and some check blocks of the N check blocks; and the generating module 810 is further configured to perform decoding and a reverse check on the at least M blocks to generate M decoded data blocks, and combine the M decoded data blocks to generate the data file.

Alternatively, as another embodiment, the distributed storage system further includes an acquiring module 870 configured to acquire a data file from the outside of the distributed storage system, or acquire the data file from some physical storage nodes of the distributed storage system.

According to this embodiment of the present invention, a redundancy algorithm is an erasure coding algorithm, and a random algorithm is a distributed hash table algorithm.

According to this embodiment of the present invention, different physical storage nodes are different physical storage nodes on the distributed storage system, each physical storage node of the different physical storage nodes includes multiple virtual storage nodes, and virtual storage nodes with consecutive serial numbers are deployed on the different physical storage nodes according to a second sorting manner that conforms to a preset rule. The determining module 820 determines, by using the random algorithm, serial number of a first virtual storage node corresponding to one block of M data blocks and N check blocks, and determines serial numbers of at least M+1 virtual storage nodes based on the serial number of the first virtual storage node and according to a first sorting manner; and the storing module 730 stores at least M+1 blocks of the M data blocks and the N check blocks onto virtual storage nodes corresponding to the serial numbers of the at least M+1 virtual storage nodes.

According to this embodiment of the present invention, the first sorting manner or the second sorting manner refers to a method of sequence sorting at a fixed interval.

For operations and functions of each module of the distributed storage apparatus 800, reference may be made to steps 110, 120, and 130 of the method in FIG. 1. No further details are provided herein to avoid repetition.

Figure 9:
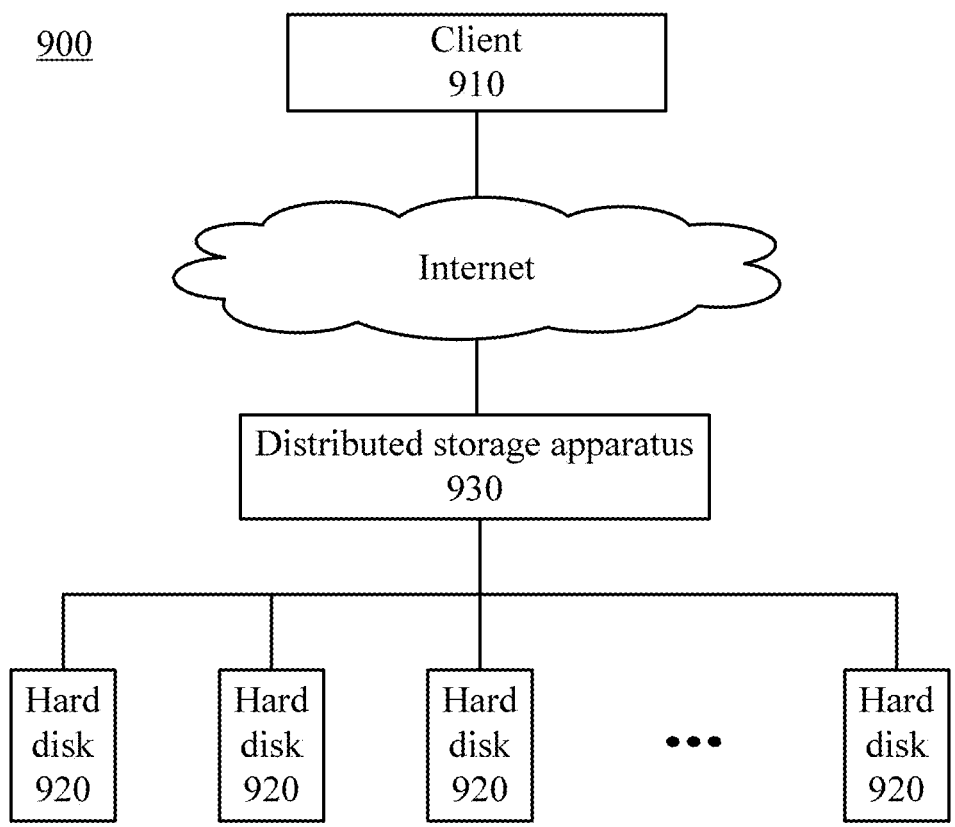
FIG. 9 is a schematic structural diagram of a distributed storage system according to an embodiment of the present invention.

FIG. 9 is a schematic structural diagram of a distributed storage system 900 according to an embodiment of the present invention. The distributed storage system 900 includes a client 910, multiple hard disks 920, and a distributed storage apparatus 930. The distributed storage apparatus 930 may be the distributed storage apparatus 700 in FIG. 7 and the distributed storage apparatus 800 in FIG. 8. No further details are provided herein.

The distributed storage apparatus 930 stores/reads a data file of a user onto/from the multiple hard disks 920 according to a storage/read request sent by the user through the client 910.

In this embodiment of the present invention, serial number of a virtual node corresponding to a data slice of a data file can be determined first by using a hash calculation, serial numbers of virtual nodes corresponding to each data block and check block of the data slice are determined based on the serial number of the virtual node and according to a rule-based sorting manner, and data blocks and check blocks are stored on corresponding virtual nodes.

Consecutive virtual nodes are distributed on different physical storage nodes, so that data blocks of the data slice can be deployed on physical storage nodes as different as possible according to the rule-based sorting manner, and a data loss that may result from a sing-point failure is reduced, thereby improving the reliability of the distributed storage system.

Figure 10:
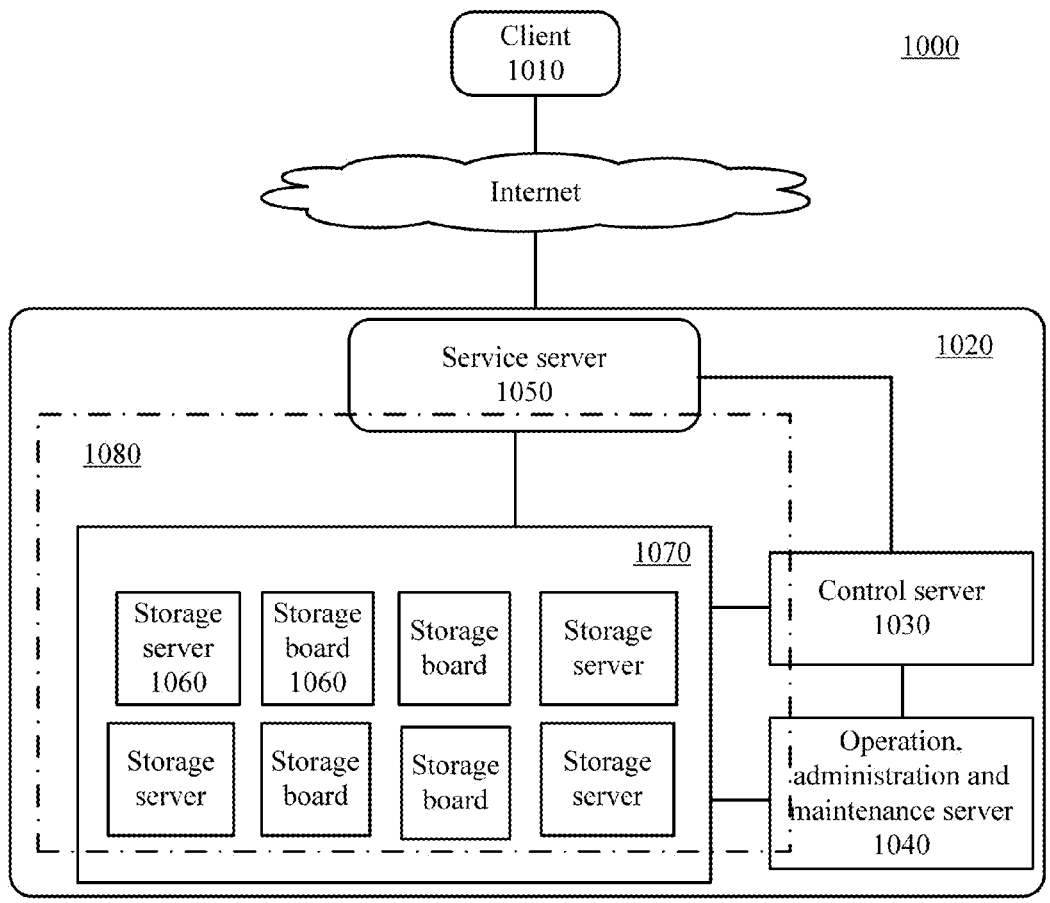
FIG. 10 is an architecture diagram of a distributed storage system according to an embodiment of the present invention.

FIG. 10 is an architecture diagram of a distributed storage system 1000 according to an embodiment of the present invention. The distributed storage system 1000 is an example of the embodiment in FIG. 9. The distributed storage system 1000 includes a client 1010 and a distributed storage server system 1020.

The client 1010 may connect to the storage server system 1020 through the Internet.

The client 1010 may run a client agent program of the distributed storage system, where the client agent program is configured to support distributed storage applications of various types in accessing the distributed storage system, for example, the client agent program may implement personal online storage and backup, enterprise online storage and backup, application online storage, other emerging storage and backup, or the like.

The distributed storage server system 1020 may include a control server 1030, an operation, administration and maintenance (OAM) server 1040, a service server 1050, a storage resource pool 1070, and a storage engine 1080. The storage engine 1080 may be an example of the distributed storage apparatus in FIG. 8.

The control server 1030 is mainly configured to control the distributed storage system to execute various storage services, for example, organizing data migration, migration, and backup and storage hot spot cancellation.

The operation, administration and maintenance server 1040 may provide a configuration interface and an operation and maintenance interface of a storage system, and provide functions such as log and alarm functions.

The service server 1050 may provide functions such as service identification and authentication, and complete a service transferring function.

The storage resource pool 1070 may include a storage resource pool formed by physical storage nodes, for example, it may be formed by storage servers/storage boards 1060, virtual nodes in each physical storage node compose a logical storage ring, and a data file of a user may be stored on the virtual nodes in the storage resource pool.

The storage engine 1080 may provide logic of main functions of the distributed storage system, and the logic may be deployed on a certain device of the control server 1030, the service server 1050, and the operation, administration and maintenance server 1040 and may also be deployed on the control server 1040, the service server 1050, the operation, administration and maintenance server 1040, and the storage resource pool 1070 in a distributed deployment manner.

Figure 11A:
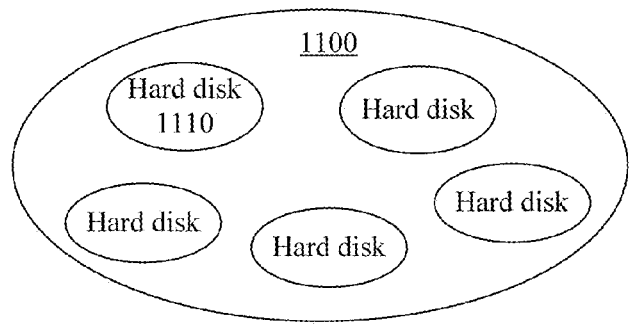
FIG. 11A is a schematic structural diagram of a storage server/storage board of a distributed storage system according to an embodiment of the present invention.
Figure 11B:
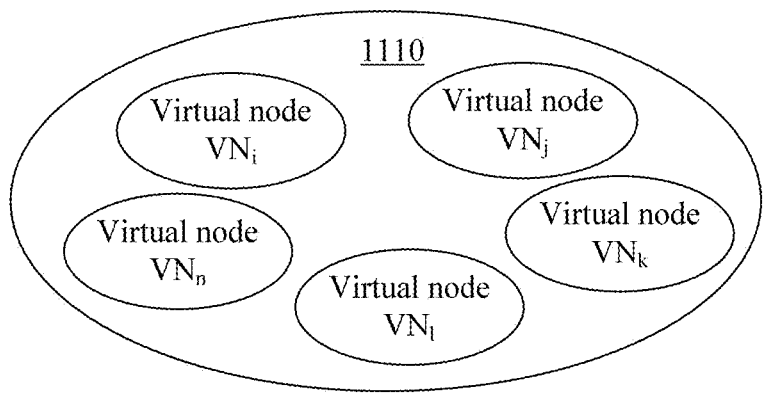
FIG. 11B is a schematic structural diagram of a hard disk of a distributed storage system according to an embodiment of the present invention.
Figure 11C:
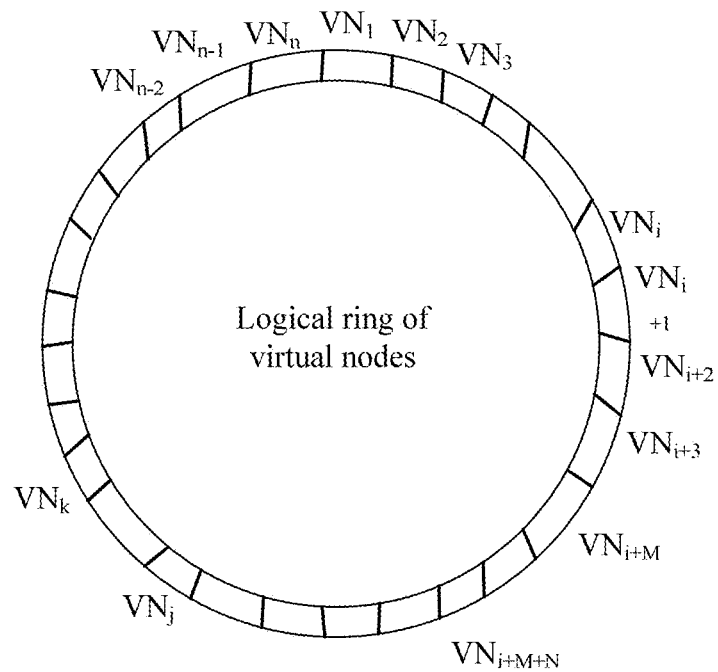
FIG. 11C is a schematic diagram of a logical ring of virtual nodes of a distributed storage system according to an embodiment of the present invention.

FIG. 11A is a schematic structural diagram of a storage server/storage board 1100 of a distributed storage system according to an embodiment of the present invention. FIG. 11B is a schematic structural diagram of a hard disk of a distributed storage system according to an embodiment of the present invention. FIG. 11C is a schematic diagram of a logical ring of virtual nodes of a distributed storage system according to an embodiment of the present invention. The storage server/storage board 1100 may be an example of the storage server/storage board 1060 in FIG. 10.

Referring to FIG. 11A, the storage server/storage board 1100 may include multiple hard disks 1110.

Referring to FIG. 11B, a hard disk 1110 is a physical storage unit, and it can be divided into multiple virtual nodes or partitions VN1 to VNn. If a hard disk is faulty, this may cause a data loss of all virtual nodes on the hard disk.

Referring to FIG. 11C, multiple virtual nodes or partitions VN1 to VNn form a logical ring of virtual nodes, that is, VNn and VN are two logically-consecutive virtual nodes. Each virtual node of the virtual storage nodes VN1 to VNn may store a certain amount of data.

Less data on a hard disk in the distributed storage system results in a higher probability that data blocks and check blocks are distributed on a same hard disk, and therefore results in a higher probability that multiple blocks are stored on a same hard disk. When the distributed storage system when the distributed storage system has only 50 hard disks, a probability that 4 blocks of 15 blocks (including 12 data blocks and 3 check blocks) are stored on a same hard disk is greatly higher than a probability that 4 blocks of 15 blocks are stored on a same hard disk when the distributed storage system has 100 hard disks.

In this embodiment of the present invention, data constancy, that is, the reliability of the distributed storage system, is significantly improved. If the method in this embodiment of the present invention is adopted, reliability is significantly improved for a system of any scale. In this case, the reliability of stored data is irrelevant to a scale of a system, and therefore the reliability changes dramatically especially for a small-scale storage system.

Referring to Table 3, when the mean time to repair (MTTR) of the distributed storage system is 730 hours, the reliability of the stored data may reach 0.98876658, and when the MTTR of the distributed storage system is 22 hours, the reliability of the stored data may reach 0.999999553.

TABLE 3

Reliability improvement effect brought about by technologies in the present invention

| Storage System Configuration | Data Constancy That Can Be Implemented in the Present Invention | Data Constancy in the Prior Art | Actual Improvement Effect |
| --- | --- | --- | --- |
| MTTR = 22 hours, Number of hard disks = 50 | 0.99999955 | 0.87946 | 99.9996% |
| MTTR = 22 hours, Number of hard disks = 100 | 0.99999955 | 0.98183 | 99.9975% |
| MTTR = 22 hours, Number of hard disks = 300 | 0.99999955 | 0.99916 | 99.9468% |
| MTTR = 730 hours, Number of hard disks = 50 | 0.98876658 | 0.74304 | 95.6283% |
| MTTR = 730 hours, Number of hard disks = 100 | 0.98876658 | 0.90758 | 87.8452% |
| MTTR = 730 hours, Number of hard disks = 300 | 0.98876658 | 0.96935 | 63.3494% |

It should be noted that the value of the best data constancy is 1, and data constancy less than 0.9 may be considered to be difficult to support commercial application.

For a storage solution (including storage systems with an erasure coding technology and other similar data backup technologies) that adopts a data redundancy coding technology, the distributed storage system according to this embodiment of the present invention eliminates a single failure point and eliminates a potential risk that a failure of a single hard disk, server, or hard disk (disk) array rack (cabinet) causes a data loss, thereby improving the data reliability of the distributed storage system.

Figure 12:
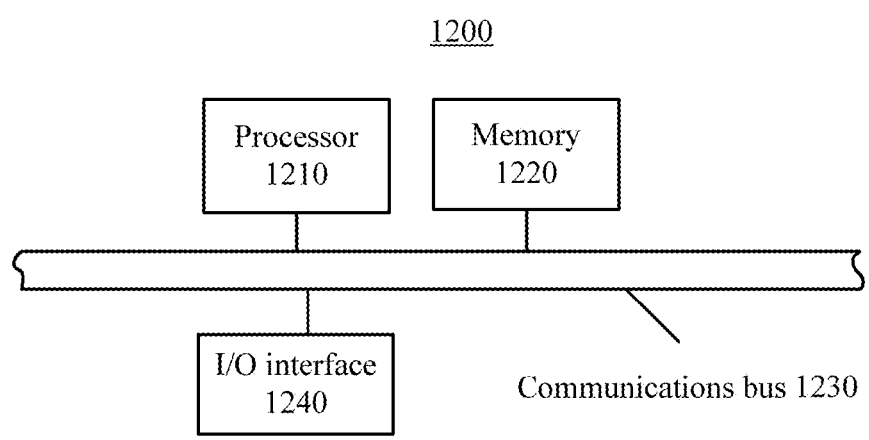
FIG. 12 is a schematic structural diagram of a distributed storage apparatus according to another embodiment of the present invention.

FIG. 12 is a schematic structural diagram of a distributed storage apparatus according to another embodiment of the present invention.

A processor 1210 invokes, through a communications bus 1230, code stored in a memory 1220, where the code is used to split a data file to generate K data slices, split each data slice of the K data slices to generate M data blocks for each data slice, and perform check coding on the M data blocks by using a redundancy algorithm to generate N check blocks; determine, by using a random algorithm, a first physical storage node corresponding to one data block or one check block of the M data blocks or the N check blocks, and determine at least M+1 different physical storage nodes based on the first physical storage node and according to a first sorting manner that conforms to a preset rule; and store at least M+1 blocks of the M data blocks and the N check blocks onto the at least M+1 different physical storage nodes, where K, M, and N are integers.

In this embodiment of the present invention, a physical storage node corresponding to a data block of the data file can be determined by using the random algorithm, at least M+1 different storage nodes are determined based on the determined physical storage node and according to a rule-based sorting manner, and at least M+1 blocks of the M data blocks and the N check blocks are stored on the at least M+1 different physical storage nodes, so that the data blocks of the data slices can be deployed on physical storage nodes as different as possible according to the rule-based sorting manner, and a data loss that may result from a sing-point failure is reduced, thereby improving the reliability of a distributed storage system.

According to this embodiment of the present invention, the processor 1210 performs a hash calculation on an identifier of one data block or check block of the M data blocks or the N check blocks to generate a key value, determines, according to the key value, a physical storage node corresponding to one data block or check block of the M data blocks or the N check blocks, and uses the physical storage node as a first physical storage node.

According to this embodiment of the present invention, the first rule-based sorting manner is a global-sequence sorting manner, a partial-sequence sorting manner, an interleaved sorting manner, or a segmented-sequence sorting manner.

According to this embodiment of the present invention, the processor 1210 performs a hash calculation on an identifier of a data slice that is split into M data blocks, so as to generate a key value, determines, according to the key value, a physical storage node corresponding to one data block or check block of the M data blocks or the N check blocks, and uses the physical storage node as the first physical storage node.

According to this embodiment of the present invention, the processor 1210 determines M+N different physical storage nodes based on the first physical storage node and according to the first sorting manner, and stores the M data blocks and the N check blocks onto the M+N different physical storage nodes.

According to this embodiment of the present invention, the processor 1210 maps the first physical storage node to one block of the at least M+1 blocks, and determines, based on a position of the first physical storage node and according to the first sorting manner, physical storage nodes corresponding to other at least M blocks of the at least M+1 blocks, where the M+1 different physical storage nodes include the first physical storage node; or determines, based on the position of the first physical storage node and according to the first sorting manner, physical storage nodes corresponding to the at least M+1 blocks, where the M+1 different physical storage nodes do not include the first physical storage node.

According to this embodiment of the present invention, the different physical storage nodes are hard disks, and the number of the hard disks is greater than or equal to M+1.

Alternatively, as another embodiment, different physical storage nodes are servers, where the number of the servers is greater than or equal to M+1.

Alternatively, as another embodiment, different physical storage nodes are racks, where the number of the racks is greater than or equal to M+1.

Alternatively, as another embodiment, the processor 1210 further restores, if one of at least M+1 different physical storage nodes that store at least M+1 blocks of M data blocks and N check blocks is faulty, data on the faulty physical storage node of the at least M+1 different physical storage nodes onto a hot standby storage node in a distributed storage system on which the physical storage node is located.

Alternatively, as another embodiment, the processor 1210 further sequentially migrates, if a physical storage node of an Lth block of M data blocks and N check blocks that are sorted according to a first sorting manner and stored on at least M+1 different physical storage nodes is faulty and if L is not greater than (M+N)/2, the Lth block of the M data blocks and the N check blocks that are sorted according to the first sorting manner and blocks prior to the Lth block to adjacent physical storage nodes along a first direction, where the first direction is opposite to a direction of a sequence in the first sorting manner; and if L is greater than (M+N)/2, sequentially migrates the Lth block of the M data blocks and the N check blocks that are sorted according to the first sorting manner and blocks after the Lth block to adjacent physical storage nodes along a second direction, where the second direction is the same as the direction of the sequence in the first sorting manner.

Alternatively, as another embodiment, the processor 1210 sequentially migrates, if a physical storage node of an Lth block of M data blocks and N check blocks that are sorted according to a first sorting manner and stored on at least M+1 different physical storage nodes is faulty, the Lth block of the M data blocks and the N check blocks that are sorted according to the first sorting manner and blocks prior to the Lth block to adjacent physical storage nodes along a first direction.

Alternatively, as another embodiment, the processor 1210 sequentially migrates, if a physical storage node of an Lth block of M data blocks and N check blocks that are sorted according to a first sorting manner and stored on at least M+1 different physical storage nodes is faulty, the Lth block of the M data blocks and the N check blocks that are sorted according to the first sorting manner and blocks after the Lth block to adjacent physical storage nodes along a second direction.

Alternatively, as another embodiment, the processor 1210 further migrates, if a new physical storage node is added after a physical storage node of a Pth block of M data blocks and N check blocks that are sorted according to a first sorting manner and stored on at least M+1 different physical storage nodes and if P is not greater than (M+N)/2, the Pth block of the M data blocks and the N check blocks that are sorted according to the first sorting manner to the new physical storage node, and sequentially migrates blocks prior to the Pth block of the M data blocks and the N check blocks that are sorted according to the first sorting manner to adjacent physical storage nodes along a first direction, where the first direction is the same as a direction of a sequence in the first sorting manner; and if P is greater than (M+N)/2, migrates a (P+1)th block of the M data blocks and the N check blocks that are sorted according to the first sorting manner to the new physical storage node, and sequentially migrates blocks after the (P+1)th block of the M data blocks and the N check blocks that are sorted according to the first sorting manner to adjacent physical storage nodes along a second direction, where the second direction is opposite to the direction of the sequence in the first sorting manner, and P is an integer.

Alternatively, as another embodiment, the processor 1210 migrates, if a new physical storage node is added after a physical storage node of a Pth block of M data blocks and N check blocks that are sorted according to a first sorting manner and stored on at least M+1 different physical storage nodes, the Pth block of the M data blocks and the N check blocks that are sorted according to the first sorting manner to the new physical storage node, and sequentially migrates blocks prior to the Pth block of the M data blocks and the N check blocks that are sorted according to the first sorting manner to adjacent physical storage nodes along a first direction.

Alternatively, as another embodiment, the processor 1210 migrates, if a new physical storage node is added after a physical storage node on which a Pth block of M data blocks and N check blocks that are sorted according to a first sorting manner and stored on at least M+1 different physical storage nodes is located, a (P+1)th block of the M data blocks and the N check blocks that are sorted according to the first sorting manner to the new physical storage node, and sequentially migrates blocks after the (P+1)th block of the M data blocks and the N check blocks that are sorted according to the first sorting manner to adjacent physical storage nodes along a second direction.

Alternatively, as another embodiment, the processor 1210 is further configured to, when a data file needs to be read, determine, by using a random algorithm, a first physical storage node corresponding to one data block or check block of M data blocks or N check blocks, and determine at least M different physical storage nodes based on the determined first physical storage node and according to a first sorting manner; the processor 1210 is further configured to read at least M blocks from the M different physical storage nodes, where the read M blocks include the M data blocks or include some data blocks of the M data blocks and some check blocks of the N check blocks; and the processor 1210 is further configured to perform decoding and a reverse check on the at least M blocks to generate M decoded data blocks, and combine the M decoded data blocks to generate the data file.

Alternatively, as another embodiment, the distributed storage system further includes an I/O interface 1240 configured to acquire a data file from the outside of the distributed storage system, or acquire the data file from some physical storage nodes of the distributed storage system.

According to this embodiment of the present invention, the different physical storage nodes are different physical storage nodes on the distributed storage system, each physical storage node of the different physical storage nodes includes multiple virtual storage nodes, and virtual storage nodes with consecutive serial numbers are deployed on the different physical storage nodes according to a second sorting manner that conforms to a preset rule. The processor 1210 determines, by using the random algorithm, serial number of a first virtual storage node corresponding to one block of the M data blocks and the N check blocks, and determines serial numbers of at least M+1 virtual storage nodes based on the serial number of the first virtual storage node and according to the first sorting manner; and the processor 1210 separately stores the at least M+1 blocks of the M data blocks and the N check blocks onto virtual storage nodes corresponding to the serial numbers of the at least M+1 virtual storage nodes.

The first sorting manner or the second sorting manner refers to a method of sequence sorting at a fixed interval.

For operations and functions of each module of the distributed storage apparatus 1200, reference may be made to steps 110, 120, and 130 of the method in FIG. 1. No further details are provided herein to avoid repetition.

A person of ordinary skill in the art may be aware that, in combination whose examples described in the embodiments disclosed in this specification, units and algorithm steps may be implemented by electronic hardware, or a combination of computer software and electronic hardware. Whether the functions are performed by hardware or software depends on the particular applications and design constraint conditions of the technical solution. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein again.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and the parts displayed as units may or may not be physical units, may be located in one position, or may be distributed on a plurality of network units. A part of or all of the units may be selected according to actual needs to achieve the objectives of the solutions of the embodiments.

In addition, functional units in the embodiments of the present invention may be integrated into one processing unit, or each of the units may exist alone physically, or two or more units may be integrated into one unit.

When the functions are implemented in a form of a software functional unit and sold or used as an independent product, the functions may be stored in a computer-readable storage medium. Based on such an understanding, the technical solutions of the present invention essentially, or the part contributing to the prior art, or a part of the technical solutions may be implemented in a form of a software product. The computer software product is stored in a storage medium and includes several instructions for instructing a computer device (which may be a personal computer, a server, or a network device) to perform all or a part of the steps of the methods described in the embodiments of the present invention. The foregoing storage medium includes any medium that can store program code, such as a USB flash drive, a removable hard disk, a read-only memory (ROM), a random access memory (RAM), a magnetic disc, or an optical disc.

The foregoing descriptions are merely specific embodiments of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

What is claimed is:

1. A distributed storage method, comprising:
   splitting, by a processor, a data file to generate K data slices;
   splitting, by the processor, each data slice of the K data slices to generate M data blocks for each data slice;
   performing, by the processor, check coding on the M data blocks by using a redundancy algorithm to generate N check blocks;
   determining, by the processor, by using a random algorithm, a first physical storage node corresponding to one data block or one check block of the M data blocks or the N check blocks;
   determining, by the processor, at least M+1 different physical storage nodes based on the first physical storage node and according to a first sorting manner that conforms to a preset rule; and
   separately storing, by the processor, at least M+1 blocks of the M data blocks and the N check blocks onto the at least M+1 different physical storage nodes, wherein K, M, and N are positive integers.

2. The distributed storage method according to claim 1, wherein determining, by the processor, the first physical storage node corresponding to one data block or one check block of the M data blocks or the N check blocks comprises:
   performing, by the processor, a hash calculation on an identifier of one data block or check block of the M data blocks or the N check blocks to generate a key value; and
   determining, by the processor, according to the key value, a physical storage node corresponding to one data block or check block of the M data blocks or the N check blocks, and using the physical storage node as the first physical storage node.

3. The distributed storage method according to claim 1, wherein determining, by the processor, the first physical storage node corresponding to one data block or one check block of the M data blocks or the N check blocks comprises:
   performing, by the processor, a hash calculation on an identifier of the data slice that is split into the M data blocks, so as to generate a key value; and
   determining, by the processor, according to the key value, a physical storage node corresponding to one data block or check block of the M data blocks or the N check blocks, and using the physical storage node as the first physical storage node.

4. The distributed storage method according to claim 1, wherein determining, by the processor, the at least M+1 different physical storage nodes based on the first physical storage node and according to the first sorting manner that conforms to the preset rule comprises determining, by the processor, M+N different physical storage nodes based on the first physical storage node and according to the first sorting manner, and wherein storing, by the processor, the at least M+1 blocks of the M data blocks and the N check blocks onto the at least M+1 different physical storage nodes comprises storing, by the processor, the M data blocks and the N check blocks onto the M+N different physical storage nodes.

5. The distributed storage method according to claim 1, wherein determining, by the processor, at least M+1 different physical storage nodes based on the first physical storage node and according to the first sorting manner that conforms to the preset rule comprises either:

mapping, by the processor, the first physical storage node to one block of the at least M+1 blocks; and any one of following steps:

determining, by the processor, based on a position of the first physical storage node and according to the first sorting manner, physical storage nodes corresponding to other at least M blocks of the at least M+1 blocks, wherein the M+1 different physical storage nodes comprises the first physical storage node; and determining, by the processor, based on the position of the first physical storage node and according to the first sorting manner, physical storage nodes corresponding to the at least M+1 blocks, wherein the M+1 different physical storage nodes do not comprise the first physical storage node.

6. The distributed storage method according to claim 1, wherein the different physical storage nodes are hard disks, and the number of the hard disks is greater than or equal to M+1; or wherein the different physical storage nodes are servers, and the number of the servers is greater than or equal to M+1; or wherein the different physical storage nodes are racks, and the number of the racks is greater than or equal to M+1.

7. The distributed storage method according to claim 1, further comprising restoring, by the processor, data on the faulty physical storage node of the at least M+1 different physical storage nodes onto a hot standby storage node in a distributed storage system on which the physical storage node is located when one of the at least M+1 different physical storage nodes that store at least M+1 blocks of the M data blocks and the N check blocks is faulty.

8. The distributed storage method according to claim 1, further comprising:

sequentially migrating, by the processor, a Lth block of the M data blocks and the N check blocks that are sorted according to the first sorting manner and blocks prior to the Lth block to adjacent physical storage nodes along a first direction when a physical storage node of an Lth block of the M data blocks and the N check blocks that are sorted according to the first sorting manner and stored on the at least M+1 different physical storage nodes is faulty and when L is not greater than (M+N)/2, wherein the first direction is opposite to a direction of a sequence in the first sorting manner, and sequentially migrating, by the processor, the Lth block of the M data blocks and the N check blocks that are sorted according to the first sorting manner and blocks after the Lth block to adjacent physical storage nodes along a second direction when L is greater than (M+N)/2, wherein the second direction is the same as the direction of the sequence in the first sorting manner; or sequentially migrating, by the processor, the Lth block of the M data blocks and the N check blocks that are sorted according to the first sorting manner and blocks prior to the Lth block to adjacent physical storage nodes along a first direction when a physical storage node of an Lth block of the M data blocks and the N check blocks that are sorted according to the first sorting manner and stored on the at least M+1 different physical storage nodes is faulty; or sequentially migrating, by the processor, the Lth block of the M data blocks and the N check blocks that are sorted according to the first sorting manner and blocks after the Lth block to adjacent physical storage nodes along a second direction when a physical storage node of an Lth block of the M data blocks and the N check blocks that are sorted according to the first sorting manner and stored on the at least M+1 different physical storage nodes is faulty.

9. The distributed storage method according to claim 1, further comprising:

migrating, by the processor, a Pth block of the M data blocks and the N check blocks that are sorted according to the first sorting manner to the new physical storage node when that a new physical storage node is added after a physical storage node of a Pth block of the M data blocks and the N check blocks that are sorted according to the first sorting manner and stored on the at least M+1 different physical storage nodes and when P is not greater than (M+N)/2, sequentially migrating, by the processor, blocks prior to the Pth block of the M data blocks and the N check blocks that are sorted according to the first sorting manner to adjacent physical storage nodes along a first direction, wherein the first direction is the same as a direction of a sequence in the first sorting manner, migrating, by the processor, a (P+1)th block of the M data blocks and the N check blocks that are sorted according to the first sorting manner to the new physical storage node when P is greater than (M+N)/2, and sequentially migrating, by the processor, blocks after the (P+1)th block of the M data blocks and the N check blocks that are sorted according to the first sorting manner to adjacent physical storage nodes along a second direction, wherein the second direction is opposite to the direction of the sequence in the first sorting manner, wherein P is an integer; or migrating, by the processor, the Pth block of the M data blocks and the N check blocks that are sorted according to the first sorting manner to the new physical storage node when a new physical storage node is added after a physical storage node of a Pth block of the M data blocks and the N check blocks that are sorted according to the first sorting manner and stored on the at least M+1 different physical storage nodes, and sequentially migrating, by the processor, blocks prior to the Pth block of the M data blocks and the N check blocks that are sorted according to the first sorting manner to adjacent physical storage nodes along a first direction; or migrating, by the processor, the (P+1)th block of the M data blocks and the N check blocks that are sorted according to the first sorting manner to the new physical storage node when a new physical storage node is added after a physical storage node on which a Pth block of the M data blocks and the N check blocks that are sorted according to the first sorting manner and stored on the at least M+1 different physical storage nodes is located, and sequentially migrating, by the processor, blocks after the (P+1)th block of the M data blocks and the N check blocks that are sorted according to the first sorting manner to adjacent physical storage nodes along a second direction.

10. The distributed storage method according to claim 1, further comprising:

determining, by the processor, by using the random algorithm, the first physical storage node corresponding to one data block or check block of the M data blocks or the N check blocks when the data file needs to be read;

determining, by the processor, at least M different physical storage nodes based on the determined first physical storage node and according to the first sorting manner;

reading, by the processor, at least M blocks from the at least M different physical storage nodes, wherein the read M blocks comprise the M data blocks or comprise some data blocks of the M data blocks and some check blocks of the N check blocks;

performing, by the processor, decoding and a reverse check on the at least M blocks to generate M decoded data blocks; and combining, by the processor, the M decoded data blocks to generate the data file.

11. The distributed storage method according to claim 1, wherein the data file is acquired from the outside of the distributed storage system, or wherein the data file is acquired from some physical storage nodes of the distributed storage system.

12. The distributed storage method according to claim 1, wherein the redundancy algorithm is an erasure coding algorithm, and wherein the random algorithm is a distributed hash table algorithm.

13. The distributed storage method according to claim 1, wherein the different physical storage nodes are different physical storage nodes on the distributed storage system, wherein each physical storage node of the different physical storage nodes comprises multiple virtual storage nodes, and wherein virtual storage nodes with consecutive serial numbers are deployed on the different physical storage nodes according to a second sorting manner that conforms to a preset rule, wherein determining, by the processor, by using a random algorithm, the first physical storage node corresponding to one data block or one check block of the M data blocks or the N check blocks, and determining, by the processor, at least M+1 different physical storage nodes based on the first physical storage node and according to the first sorting manner that conforms to a preset rule comprises:

determining, by the processor, by using the random algorithm, a serial number of a first virtual storage node corresponding to one block of the M data blocks and the N check blocks; and determining, by the processor, the serial numbers of at least M+1 virtual storage nodes based on the serial number of the first virtual storage node and according to the first sorting manner, and wherein separately storing at least M+1 blocks of the M data blocks and the N check blocks onto the at least M+1 different physical storage nodes comprises storing the at least M+1 blocks of the M data blocks and the N check blocks onto virtual storage nodes corresponding to the serial numbers of the at least M+1 virtual storage nodes.

14. The distributed storage method according to claim 13, wherein the first sorting manner or the second sorting manner refers to a method of sequence sorting at a fixed interval.

15. A distributed storage system, comprising:

a client;

multiple physical storage nodes; and a distributed storage apparatus, wherein the distributed storage apparatus stores or reads a data file of a user onto or from the multiple physical storage nodes according to a storage or read request sent by the user through the client, and wherein the distributed storage apparatus comprises:

a generating module configured to:
split a data file to generate K data slices;
split each data slice of the K data slices to generate M data blocks for each data slice; and
perform check coding on the M data blocks by using a redundancy algorithm to generate N check blocks;

a determining module configured to:
determine, by using a random algorithm, a first physical storage node corresponding to one data block or one check block of the M data blocks or the N check blocks; and
determine at least M+1 different physical storage nodes based on the first physical storage node and according to a first sorting manner that conforms to a preset rule; and a storing module configured to store at least M+1 blocks of the M data blocks and the N check blocks onto the at least M+1 different physical storage nodes, wherein K, M, and N are positive integers.

16. The distributed storage system according to claim 15, wherein the determining module is configured to:

perform a hash calculation on an identifier of one data block or check block of the M data blocks or the N check blocks to generate a key value;

determine, according to the key value, a physical storage node corresponding to one data block or check block of the M data blocks or the N check blocks; and use the physical storage node as the first physical storage node.

17. A distributed storage apparatus, a processor and a memory coupled to the processor, wherein the processor is configured to:

split a data file to generate K data slices;

split each data slice of the K data slices to generate M data blocks for each data slice;

perform check coding on the M data blocks by using a redundancy algorithm to generate N check blocks;

determine by using a random algorithm, a first physical storage node corresponding to one data block or one check block of the M data blocks or the N check blocks;

determine at least M+1 different physical storage nodes based on the first physical storage node and according to a first sorting manner that conforms to a preset rule; and separately store at least M+1 blocks of the M data blocks and the N check blocks onto the at least M+1 different physical storage nodes, wherein K, M, and N are positive integers.

18. The distributed storage apparatus according to claim 17, wherein determining the first physical storage node corresponding to one data block or one check block of the M data blocks or the N check blocks comprises:

performing a hash calculation on an identifier of one data block or check block of the M data blocks or the N check blocks to generate a key value; and determining according to the key value, a physical storage node corresponding to one data block or check block of the M data blocks or the N check blocks, and using the physical storage node as the first physical storage node.

19. The distributed storage apparatus according to claim 17, wherein determining the first physical storage node corresponding to one data block or one check block of the M data blocks or the N check blocks comprises:

performing a hash calculation on an identifier of the data slice that is split into the M data blocks, so as to generate a key value; and determining according to the key value, a physical storage node corresponding to one data block or check block of the M data blocks or the N check blocks, and using the physical storage node as the first physical storage node.

20. The distributed storage apparatus according to claim 17, wherein determining the at least M+1 different physical storage nodes based on the first physical storage node and according to the first sorting manner that conforms to the preset rule comprises determining M+N different physical storage nodes based on the first physical storage node and according to the first sorting manner, and wherein store the at least M+1 blocks of the M data blocks and the N check blocks onto the at least M+1 different physical storage nodes comprises store the M data blocks and the N check blocks onto the M+N different physical storage nodes.

21. The distributed storage apparatus according to claim 17, wherein determining at least M+1 different physical storage nodes based on the first physical storage node and according to the first sorting manner that conforms to the preset rule comprises either:
  mapping the first physical storage node to one block of the at least M+1 blocks; and any one of following steps:
  determining based on a position of the first physical storage node and according to the first sorting manner, physical storage nodes corresponding to other at least M blocks of the at least M+1 blocks, wherein the M+1 different physical storage nodes comprises the first physical storage node; and
  determining based on the position of the first physical storage node and according to the first sorting manner, physical storage nodes corresponding to the at least M+1 blocks, wherein the M+1 different physical storage nodes do not comprise the first physical storage node.

22. The distributed storage apparatus according to claim 17, wherein the different physical storage nodes are hard disks, and the number of the hard disks is greater than or equal to M+1; or wherein the different physical storage nodes are servers, and the number of the servers is greater than or equal to M+1; or wherein the different physical storage nodes are racks, and the number of the racks is greater than or equal to M+1.

23. The distributed storage apparatus according to claim 17, wherein the processor is further configured to: restore data on the faulty physical storage node of the at least M+1 different physical storage nodes onto a hot standby storage node in a distributed storage system on which the physical storage node is located when one of the at least M+1 different physical storage nodes that store at least M+1 blocks of the M data blocks and the N check blocks is faulty.

24. The distributed storage apparatus according to claim 17, wherein the processor is configured to:
  sequentially migrate a Lth block of the M data blocks and the N check blocks that are sorted according to the first sorting manner and blocks prior to the Lth block to adjacent physical storage nodes along a first direction when a physical storage node of an Lth block of the M data blocks and the N check blocks that are sorted according to the first sorting manner and stored on the at least M+1 different physical storage nodes is faulty and when L is not greater than (M+N)/2, wherein the first direction is opposite to a direction of a sequence in the first sorting manner, and sequentially migrate the Lth block of the M data blocks and the N check blocks that are sorted according to the first sorting manner and blocks after the Lth block to adjacent physical storage nodes along a second direction when L is greater than (M+N)/2, wherein the second direction is the same as the direction of the sequence in the first sorting manner; or
  sequentially migrate the Lth block of the M data blocks and the N check blocks that are sorted according to the first sorting manner and blocks prior to the Lth block to adjacent physical storage nodes along a first direction when a physical storage node of an Lth block of the M data blocks and the N check blocks that are sorted according to the first sorting manner and stored on the at least M+1 different physical storage nodes is faulty; or
  sequentially migrate the Lth block of the M data blocks and the N check blocks that are sorted according to the first sorting manner and blocks after the Lth block to adjacent physical storage nodes along a second direction when a physical storage node of an Lth block of the M data blocks and the N check blocks that are sorted according to the first sorting manner and stored on the at least M+1 different physical storage nodes is faulty.

25. The distributed storage apparatus according to claim 17, wherein the processor is further configured to:
  migrate a Pth block of the M data blocks and the N check blocks that are sorted according to the first sorting manner to the new physical storage node when that a new physical storage node is added after a physical storage node of a Pth block of the M data blocks and the N check blocks that are sorted according to the first sorting manner and stored on the at least M+1 different physical storage nodes and when P is not greater than (M+N)/2, sequentially migrate blocks prior to the Pth block of the M data blocks and the N check blocks that are sorted according to the first sorting manner to adjacent physical storage nodes along a first direction, wherein the first direction is the same as a direction of a sequence in the first sorting manner, migrate a (P+1)th block of the M data blocks and the N check blocks that are sorted according to the first sorting manner to the new physical storage node when P is greater than (M+N)/2, and sequentially migrate blocks after the (P+1)th block of the M data blocks and the N check blocks that are sorted according to the first sorting manner to adjacent physical storage nodes along a second direction, wherein the second direction is opposite to the direction of the sequence in the first sorting manner, wherein P is an integer; or
  migrate the Pth block of the M data blocks and the N check blocks that are sorted according to the first sorting manner to the new physical storage node when a new physical storage node is added after a physical storage node of a Pth block of the M data blocks and the N check blocks that are sorted according to the first sorting manner and stored on the at least M+1 different physical storage nodes, and sequentially migrate blocks prior to the Pth block of the M data blocks and the N check blocks that are sorted according to the first sorting manner to adjacent physical storage nodes along a first direction; or
  migrate the (P+1)th block of the M data blocks and the N check blocks that are sorted according to the first sorting manner to the new physical storage node when a new physical storage node is added after a physical storage node on which a Pth block of the M data blocks and the N check blocks that are sorted according to the first sorting manner and stored on the at least M+1 different physical storage nodes is located, and sequentially migrate blocks after the (P+1)th block of the M data blocks and the N check blocks that are sorted according to the first sorting manner to adjacent physical storage nodes along a second direction.

26. The distributed storage apparatus according to claim 17, wherein the processor is further configured to:
  determine by using the random algorithm, the first physical storage node corresponding to one data block or check block of the M data blocks or the N check blocks when the data file needs to be read;

determine at least M different physical storage nodes based on the determined first physical storage node and according to the first sorting manner;

read at least M blocks from the at least M different physical storage nodes, wherein the read M blocks comprise the M data blocks or comprise some data blocks of the M data blocks and some check blocks of the N check blocks;

perform decoding and a reverse check on the at least M blocks to generate M decoded data blocks; and combine the M decoded data blocks to generate the data file.

27. The distributed storage apparatus according to claim 17, wherein the data file is acquired from the outside of the distributed storage system, or wherein the data file is acquired from some physical storage nodes of the distributed storage system.

28. The distributed storage apparatus according to claim 17, wherein the redundancy algorithm is an erasure coding algorithm, and wherein the random algorithm is a distributed hash table algorithm.

29. The distributed storage apparatus according to claim 17, wherein the different physical storage nodes are different physical storage nodes on the distributed storage system, wherein each physical storage node of the different physical storage nodes comprises multiple virtual storage nodes, and wherein virtual storage nodes with consecutive serial numbers are deployed on the different physical storage nodes according to a second sorting manner that conforms to a preset rule, wherein determine by using a random algorithm, the first physical storage node corresponding to one data block or one check block of the M data blocks or the N check blocks, and determining at least M+1 different physical storage nodes based on the first physical storage node and according to the first sorting manner that conforms to a preset rule comprises:

determining by using the random algorithm, a serial number of a first virtual storage node corresponding to one block of the M data blocks and the N check blocks; and determining the serial numbers of at least M+1 virtual storage nodes based on the serial number of the first virtual storage node and according to the first sorting manner, and wherein separately storing at least M+1 blocks of the M data blocks and the N check blocks onto the at least M+1 different physical storage nodes comprises storing the at least M+1 blocks of the M data blocks and the N check blocks onto virtual storage nodes corresponding to the serial numbers of the at least M+1 virtual storage nodes.

30. The distributed storage apparatus according to claim 29, wherein the first sorting manner or the second sorting manner refers to a method of sequence sorting at a fixed interval.

31. A non-transitory computer-readable medium having computer executable instructions for performing an information publishing method comprising:

Splitting a data file to generate K data slices;

Splitting each data slice of the K data slices to generate M data blocks for each data slice;

performing check coding on the M data blocks by using a redundancy algorithm to generate N check blocks;

determining, by using a random algorithm, a first physical storage node corresponding to one data block or one check block of the M data blocks or the N check blocks;

determining at least M+1 different physical storage nodes based on the first physical storage node and according to a first sorting manner that conforms to a preset rule; and separately storing at least M+1 blocks of the M data blocks and the N check blocks onto the at least M+1 different physical storage nodes, wherein K, M, and N are positive integers.

* * * * *